United States Patent [19]

Christensen et al.

[11] Patent Number: 4,488,294
[45] Date of Patent: Dec. 11, 1984

[54] ESTABLISHING AND SUPPORTING DATA TRAFFIC IN PRIVATE BRANCH EXCHANGES

[75] Inventors: Tore L. Christensen; Gail L. Haygood; Douglas A. Spencer; Steven J. Szymanski, all of Boulder, Colo.

[73] Assignee: AT&T Bell Laboratories, Murray Hill, N.J.

[21] Appl. No.: 363,424

[22] Filed: Mar. 30, 1982

[51] Int. Cl.³ .............................................. H04J 3/02
[52] U.S. Cl. .................................. 370/84; 370/110.1; 375/118
[58] Field of Search .................. 370/110.1, 79, 84, 85, 370/102; 375/118

[56] References Cited

U.S. PATENT DOCUMENTS

| | | | |
|---|---|---|---|
| 3,461,245 | 8/1969 | Johannes et al. | 370/102 |
| 3,497,627 | 2/1970 | Blasbalg et al. | 370/84 |
| 3,652,800 | 3/1972 | Dooley | 370/67 |
| 3,739,351 | 6/1973 | Forbes | 375/118 |
| 3,746,800 | 7/1973 | Stuart | 375/118 |
| 3,789,154 | 1/1974 | Medill | 179/99 |
| 3,862,373 | 1/1975 | Cohen et al. | 370/110.1 |
| 3,876,833 | 4/1975 | Breant | 375/118 |
| 3,934,099 | 1/1976 | Elder, Jr. | 179/170 |
| 4,025,720 | 5/1977 | Pachynski, Jr. | 370/102 |
| 4,147,895 | 4/1979 | Fenoglio | 375/118 |
| 4,154,985 | 5/1979 | Munter | 370/84 |
| 4,215,245 | 7/1980 | Bellisio | 370/84 |
| 4,229,815 | 10/1980 | Cummiskey | 370/85 |
| 4,247,937 | 1/1981 | Paesler | 370/102 |
| 4,270,183 | 5/1981 | Robinson et al. | 375/118 |
| 4,330,856 | 5/1982 | Takasaki et al. | 370/102 |
| 4,398,287 | 8/1983 | Spencer | 370/85 |

FOREIGN PATENT DOCUMENTS 2521731 10/1976 Fed. Rep. of Germany ........ 370/84

OTHER PUBLICATIONS

J. Anderson, "1200 bps, Full-Duplex, 2-Wire Data Transmission-Impossible," Telecommunications, May 1981, pp. 55-56.
T. Ohyama, T. Gotoda, A. Takada, "A ROM-Controlled LSI Sequencer for Digital Data Subscriber Loop Transmission Equipment," Fujitsu Scientific & Technical Journal, Jun. 1981, pp. 1-14.
"MIL-STD-1553 Hookup for Terminals, Peripherals: Manchester Terminal Unit in CMOS LSI", Military Elec./Comm., vol. 5 No. 4, Apr. 1979, pp. 42-47.

Primary Examiner—Douglas W. Olms
Assistant Examiner—Wellington Chin
Attorney, Agent, or Firm—J. W. Herndon; H. R. Popper

[57] ABSTRACT

Apparatus for facilitating the transport and switching of synchronous and asynchronous digital data signals presented by data terminal or data communication equipments to a voice switching network such as a PBX advantageously without the use of modems. The clock rate of the PBX user's digital data is multiplied by a variable factor to define a synchronous transmission clock rate on a data link between a pair of interfaces, one locally connecting to the data terminal or data communications equipment and the other appearing as a port of the PBX switching equipment. The higher rate on the data link permits both the digital data as well as a control channel to be provided. Variations in the data terminal or data communications equipment clock rate do not affect the control channel. Variations in the voice sampling rate of switching modules serving different groups of ports through which the digital data is transported are accommodated.

9 Claims, 19 Drawing Figures

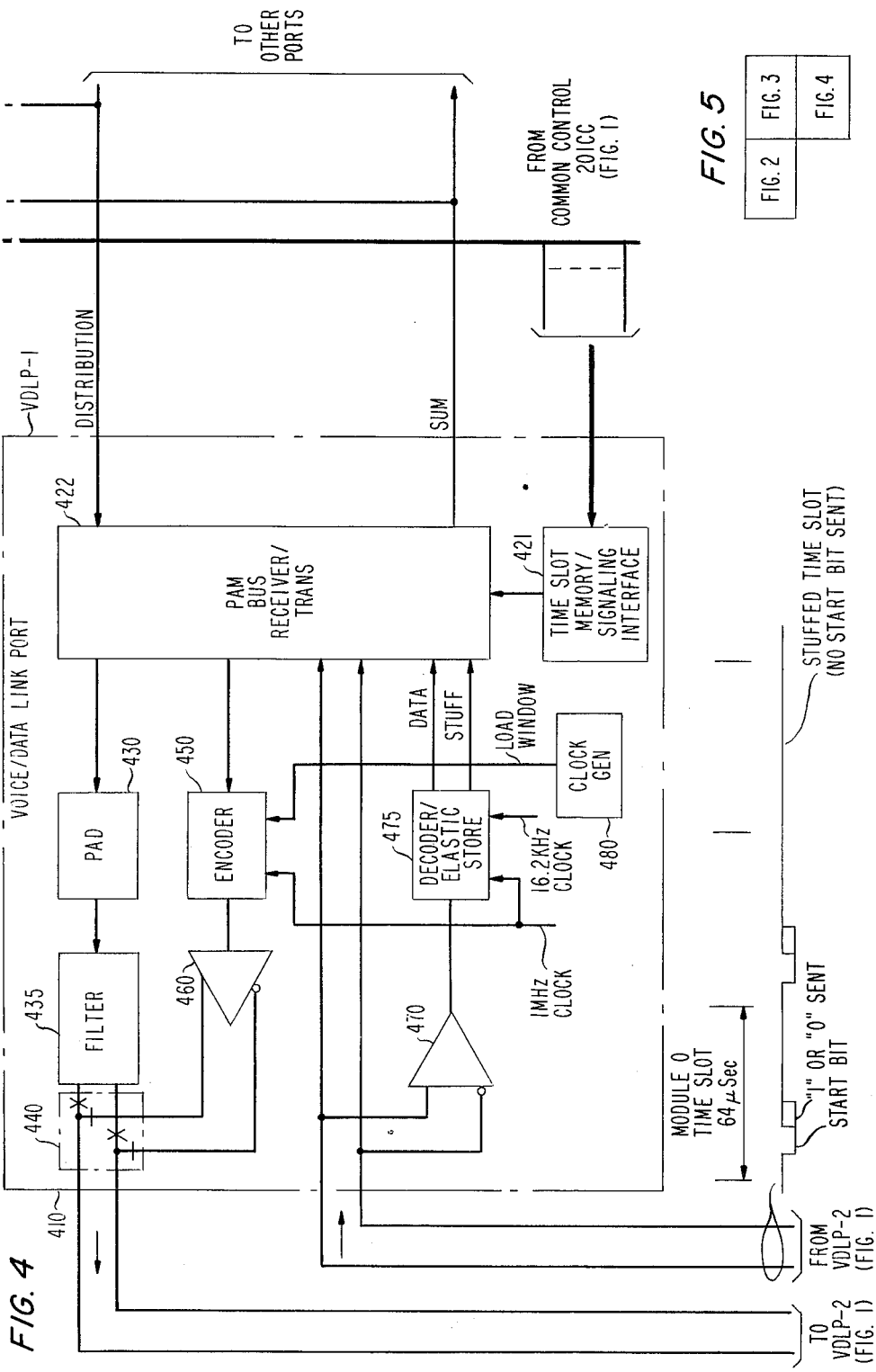

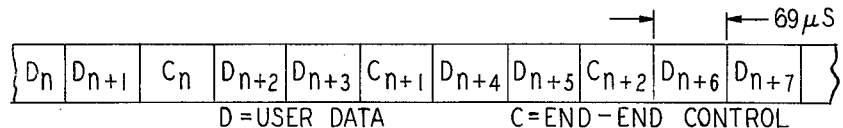

FIG. 6 DDL BIT STREAM FORMAT

| $D_n$ | $D_{n+1}$ | $C_n$ | $D_{n+2}$ | $D_{n+3}$ | $C_{n+1}$ | $D_{n+4}$ | $D_{n+5}$ | $C_{n+2}$ | $D_{n+6}$ | $D_{n+7}$ |

←— 69 μS

D = USER DATA   C = END-END CONTROL

FIG. 7 DI ↔ DP CONTROL CHANNEL MESSAGES

DDL CONTROL CHANNEL FRAME FORMAT

| ($C_{n+7}$) S | | Y | | N | | C ($C_n$) |
|---|---|---|---|---|---|---|
| 7.1 | | DDL | MESSAGE | | | |
| | | E-E | MESSAGE | | | |

END-TO-END MESSAGES

| | | | | | | | | |
|---|---|---|---|---|---|---|---|---|
| 7.2 | 0 | 0 | 9.6 | 4.8 | 2.4 | 1.2 | 300 | LOW |
| | 0 | 1 | ACK | SW | DCE/DTE | HALF/FULL DUPLEX | INT/EXT INT/SLAVE | ASYNC/SYNC |
| 7.3 | 0 | 1 | ACK=1 | SW=1 | DCE/DTE | HALF/FULL DUPLEX | INT/EXT INT/SLAVE | ASYNC/SYNC |

HANDSHAKING MESSAGES

| 7.4 | 1 | 0 | REMOTE LOOP-BACK | REMOTE LOCAL LOOP B'K | REMOTE REMOTE LOOP B'K | 0 | TERM READY | REQ TO SEND |

SENT TO DTE - DI'S

| 7.5 | 1 | 0 | REMOTE LOOP-BACK | 0 | 0 | SIGNAL DETECT | DATA SET READY | CLEAR TO SEND |

SENT TO DCE - DT'S

| 7.6 | 1 | 1 | 0 | 1 | 0 | 0 | 0 | 0 |

NO CONNECTION

DOL MESSAGES

| 7.7 | 1 | 1 | 0 | RINGING | ←-- ENCODED TONES --→ | | | |

0001 RINGBACK
0010 BUSY
0011 REORDER
0100 DIAL TONE
0101 INTER
0110 CONFIRMATION

| 7.8 | 1 | 1 | 0 | 1 | 0 | 0 | 0 | 0 | DLE |

| 7.9 | 1 | 1 | 1 | 0 | 1 | 0 | 1 | 0 | SYNC |

ESTABLISHING AND SUPPORTING DATA TRAFFIC IN PRIVATE BRANCH EXCHANGES

FIELD OF THE INVENTION

This invention relates to the switching of digital data signals through a switching network such as a private branch exchange, especially a large private branch exchange having a plurality of unsynchronized voice-sampling modules.

BACKGROUND OF THE INVENTION

To facilitate the interconnection of a variety of computer peripheral and terminal devices, standard interface specifications have been promulgated by various standard-setting organizations. Among the most familiar is RS232C developed by the Electronics Industries Association (EIA). This interface defines connection points for digital data signals and control ("handshaking") signals. The data signals emanating from this interface are not intended to be transmitted more than 50 feet by direct wire; for greater distances, conventional modems are usually required.

In the co-pending application of D. A. Spencer entitled "Digital Switching over a PAM Bus System," filed Sept. 1, 1981, Ser. No. 298,381, an arrangement is described which overcomes one of the problems encountered when attempting to switch digital data signals through a PBX without using modems (i.e. at baseband) at distances considerably greater than 50 feet. Advantage is sought to be taken of the comparatively high voice-sampling rate in the PBX in order to convey a PBX user's digital data signals having a lower bit rate. When such a PBX employs a PAM bus system having operational amplifiers that exhibit deliberate but loosely-controlled DC offsets, there may be some difficulty in establishing a uniform reference level for "slicing", i.e., categorizing the level of a received data signal as a "1" or "0". In the foregoing patent application each time slot was divided into a preamble interval during which the actual DC offset is measured and an active interval during which the measured offset is subtracted from the received data signal.

While a PAM bus sampling rate that is higher than a user's data signaling rate makes it conceivable for a PBX to switch the user's data at baseband without the use of voice band modems, other characteristics of the user's data equipment and signaling format must also be considered. When voice band modems are used, the PBX has the comparatively simple job of establishing a transparent channel between the modems just as if a voice call were all that was going to be completed.

PBX switching equipment can normally provide only a 2-wire switched path between its calling and called ports. Four-wire paths are normally required for full duplex operation at data rates of 1200 bits per second or greater. While "line drivers" costing less than modems can be used to transport a user's digital data over dedicated metallic paths at synchronous speeds up to 19.2 kbits per second, the use of such data communications equipment at each end of the dedicated path presupposes that the path is not switched and that only data communications equipment appears at each end of the path, i.e., there is no provision made for transporting and properly interpreting the EIA control signals that might be required to interconnect different types of data terminal equipment.

If the user is to be given the freedom of having the PBX reliably interconnect and automatically maintain the interconnection of a variety of different types of data handling equipment, either the PBX or interface equipment must undertake to verify the compatibility of the user's equipment and arrange for the continuous transport of the necessary control information presented at the interface throughout the duration of the call. For example, when the user desires to set up an intra-PBX connection between a data terminal and a computer port, the PBX must appear both to the data terminal and to the computer as if it were data communications equipment (DCE). On another call, however, the user may wish to have the PBX connect the data terminal to a remotely located computer via a modem-equipped private line. In such a case the PBX must appear as if it were data communications equipment (DCE) to the data terminal but as data terminal equipment (DTE) to the modem-equipped private line.

In each of these cases the user will also want to specify whether his data equipment is to operate in the full duplex or half duplex mode, in the synchronous or asynchronous mode and whether the data terminal or data communications equipment shall control transmission timing or whether timing is to be controlled by devices for interfacing these equipments to the PBX. In the latter case, shall timing be controlled by the local interface device clock or by the clock recovered from signals received from the remote interface device?

Data terminal equipment and data communications equipment are usually built to conform to agreed standards such as those recommended by the CCITT, the Electronics Industries Association (EIA), the International Standards Organization (ISO) and the American National Standards Institute (ANSI). CCITT recommendation V.22, for example, governing synchronous transmission at 1200 bits per second, specifies a tolerance on the bit rate of ±0.01%. CCITT recommendation X.21, governing synchronous transmission from 2.4 kbits per second through 48 kbits per second contains similar tolerances. The establishment and reliable maintenance of a plurality of data communications connections within the PBX requires that the myriad encountered variations from the nominally specified bit rate be accommodated by the interface devices, i.e. that the interface devices not add to the jitter exhibited by the equipments being interconnected by the PBX.

Further, when the PBX is large enough to comprise a number of independently clocked switching modules it would be advantageous to be able to overcome the additional jitter problems occasioned by the variation in PBX voice-sampling rate among the modules.

In addition, it would be desirable for a data terminal user to be able to employ the terminal keyboard to control the PBX switching equipment to establish a data communications connection without the need for a dedicated telephone set.

BRIEF SUMMARY OF THE INVENTION

In accordance with one aspect of the present invention, the synchronous or asynchronous data presented by a PBX user's data communications or data terminal equipment is locally accepted at a digital data interface unit together with the data equipment's conventional parallel-lead EIA information. The digital data interface unit includes a synthesizer which multiplies the clock rate of the presented data by a variable factor to establish a synchronous transmission clock rate (14,400 bits per second) on a data link to a digital data port unit having an appearance in a module of the voice-sampling PBX. The transmission rate on the data link is selected to be equal to or less than the voice sampling rate of the PBX and high enough not only to carry the user's data but also high enough to provide a channel for end-to-end control once a connection through the PBX is established between the PBX user's calling and called data terminal or data communications equipments.

At the digital port, data arriving over the data link at the nominal rate of 14,400 bits per second is written into a buffer. Data is read out of the buffer at the PBX voice sampling rate (16,200 bits per second). The fullness of the buffer is monitored. Whenever the fullness of the buffer falls below a given threshold, the read clock is overridden and the corresponding voice sampling time slot is "stuffed." This requires that three logic states be transmitted through the PBX time slot bus: logic "1", logic "0" and a "stuff" state. The three states are represented by three-level signaling on the PAM bus. Accordingly, during periods of full duplex signaling a five-level signal may be generated on the PBX distribution bus by the different possible combinations of signal levels taken two at a time.

At the other end of the PBX connection a similar digital port is provided to retrieve the three-level signal from the PAM bus. The retrieved three-level signal is gated against the 16,200 bit per second voice sampling clock to separate data signals (positive or negative levels) from "stuff" signals (zero level) and to recover timing information. A resulting "gapped clock" is averaged-out in a digital timing recovery circuit to obtain a smooth clock at the nominal rate of 14,400 bits per second for transmission over a second synchronous full duplex data link to a destination digital interface unit.

It is another aspect of the present invention that ASCII terminal dialing is transported to the PBX switching equipment by a phantom loop current applied over the four wire data link between the digital interface and the digital port. The on-hook, off-hook dialing states are reported to the PBX at the digital port without burdening the data link control channel.

Where data must be transmitted between PBX switching modules that are sampled by unsynchronized PBX clocks, the data is transferred via an inter-module link. Instead of a three-level signal, the data which is transmitted over the inter-module link is preceded by a start interval and is followed by an active interval of equal duration which is either in a high state or a low state depending on the polarity of the data bit actually transferred. During time slots which were stuffed in the sending module the start character is not sent. The length of the start and data intervals is a multiple of the basic network clock interval. At the receiving module the data is buffered and is then resynchronized with the actual voice sampling rate on the bus of the receiving module.

BRIEF DESCRIPTION OF THE DRAWINGS

FIGS. 2, 3 and 4, arranged as shown in FIG. 5, show additional internal details of the digital interface unit, the digital port unit and the inter-module link units;

FIG. 6 shows the bit stream format on the data link between the digital interface and the digital port of our invention;

FIG. 7 shows the control channel messages exchanged between the digital interface and digital port;

GENERAL DESCRIPTION

Figure 1:
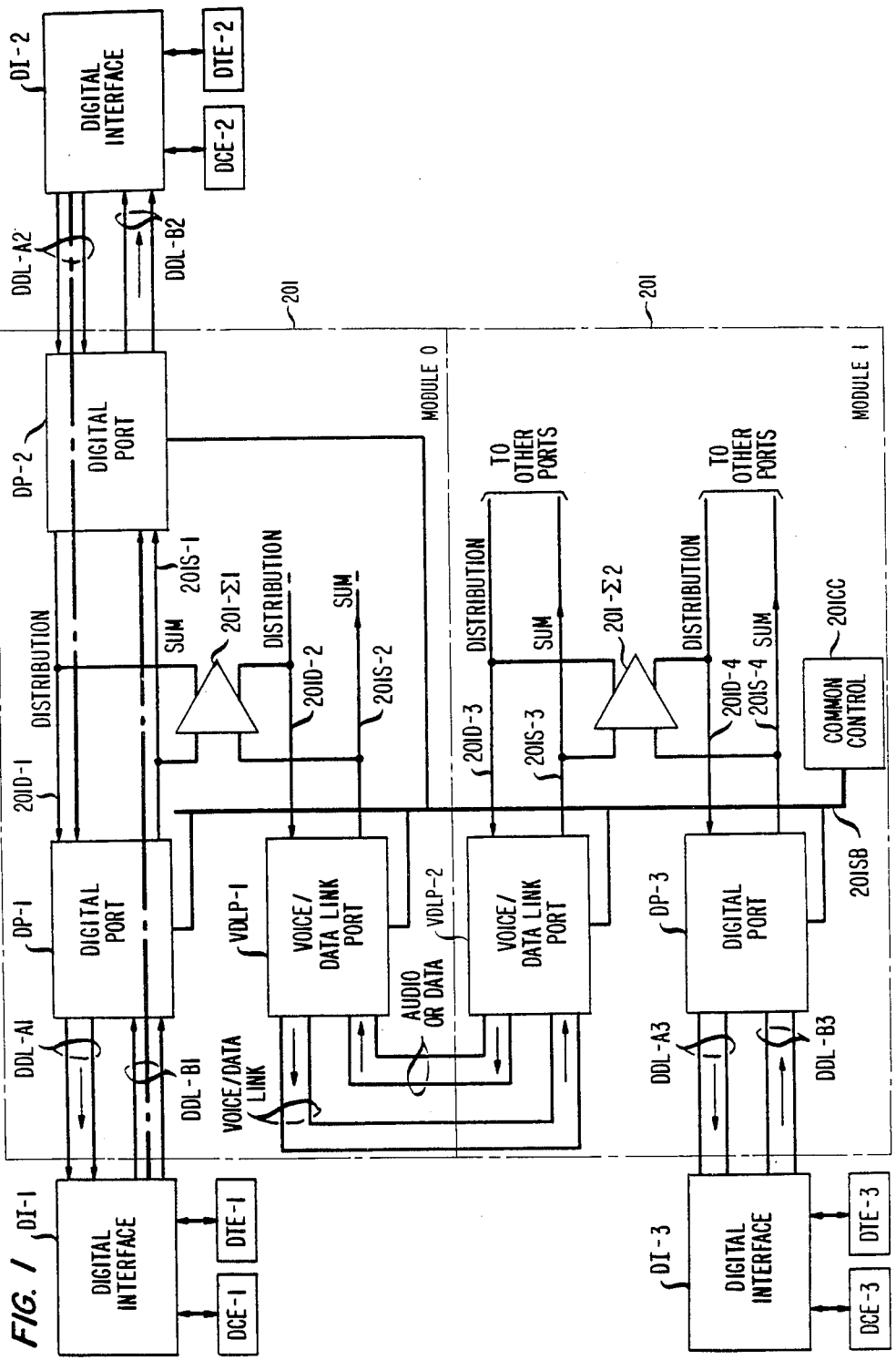
FIG. 1 is a general block diagram showing the location of the digital interface and digital port units of our invention in relationship to the PBX user's data terminal equipment or data communication equipment, on the one hand, and the PBX switching modules on the other.

Let it be assumed that a PBX user's data terminal equipment DTE-1 (which may include a data terminal having a keyboard and video display, not shown) is situated at a first location (upper left-hand side of FIG. 1) servable by switching module "0" of PBX switching equipment 201. Switching equipment 201 comprises a DIMENSION ® PBX manufactured by Western Electric Company, Incorporated or any similar type of switching equipment. Switching equipment 201 illustratively comprises two modules 0 and 1 each consisting of a group of ports appearing on a given sum and distribution bus pair for interport communication. A commonn control 201CC and commo bus 201SB serves one or more modules. In addition to modules 0 and 1, switching equipment 201 includes common control 201CC and bus 201SB. Let it be assumed that at a second location (right-hand side of FIG. 1) also servable by module "0" of switching equipment 201, the PBX user has a second item of data terminal equipment, DTE-2, such as a host computer. At a third location, (lower left-hand side of FIG. 1) the PBX user has a third item of data terminal equipment, DTE-3, servable by switching module "1" of switching equipment 201. The PBX user desires to be able selectively to "dial-up" either equipment DTE-2 or DTE-3 employing the keyboard of data terminal equipment DTE-1. A digital interface unit DI-1 is provided which is capable of serving data communication equipment DCE-1 to make an intra-PBX connection to data terminal equipment DTE-3 Digital interface unit DI-3, which is similar to interface unit DI-1 is capable of serving data communications equipment DCE-3 on an intra-PBX connection to data terminal equipment DTE-1.

It is desired that the dialed-up PBX connection should be capable of transporting at baseband within the PBX any of the PBX user's asynchronous or synchronous digital data at any of a plurality of "standard" bit rates. Transmission at baseband means that no modem is required at each end of the connection.

In accordance with the principles of our invention, the PBX user's data terminal equipment DTE-1 is locally connected to a digital interface unit DI-1 which adapts the user's digital data and the requisite EIA lead control signals for transport through the PBX switching equipment. A pair of bipolar data links DDL-A1 and DDL-B1 connect interface unit DI-1 to a digital data port DP-1 that is centrally located on a switching frame of PBX switching equipment 201.

Digital port DP-1 provides an interface between PBX switching equipment 201 and digital data links DDL-A1, B1. The digital port is advantageously arranged so that it can be plugged into either a line carrier or a trunk carrier of switching equipment 201. In the latter case the data port would be classed as dial-repeating in-, automatic-out, tie-trunk, and would be accessed by PBX common control 201CC as like a normal port. The digital port includes time-slot stuffing circuitry, tone detector circuit, and two timing recovery-elastic store circuits.

Since the clocks defining user data transmission in each direction (i.e., from DTE-1, FIG. 1, to DTE-2 on the one hand and from DTE-2 to DTE-1 on the other) are not synchronized, digital port DP-1 is provided with an elastic store for each direction of transmission. The elastic store function is implemented by buffer and stuffer circuit in the data path toward the PBX (hereinafter sometimes called the outgoing data path) and by a synchronizing and multiplexing circuit on the data path away from the PBX (hereinafter sometimes called the incoming data path). The synchronizing and multiplexing circuit has the additional function of multiplexing digital port to data interface information into the data stream.

Figure 11:
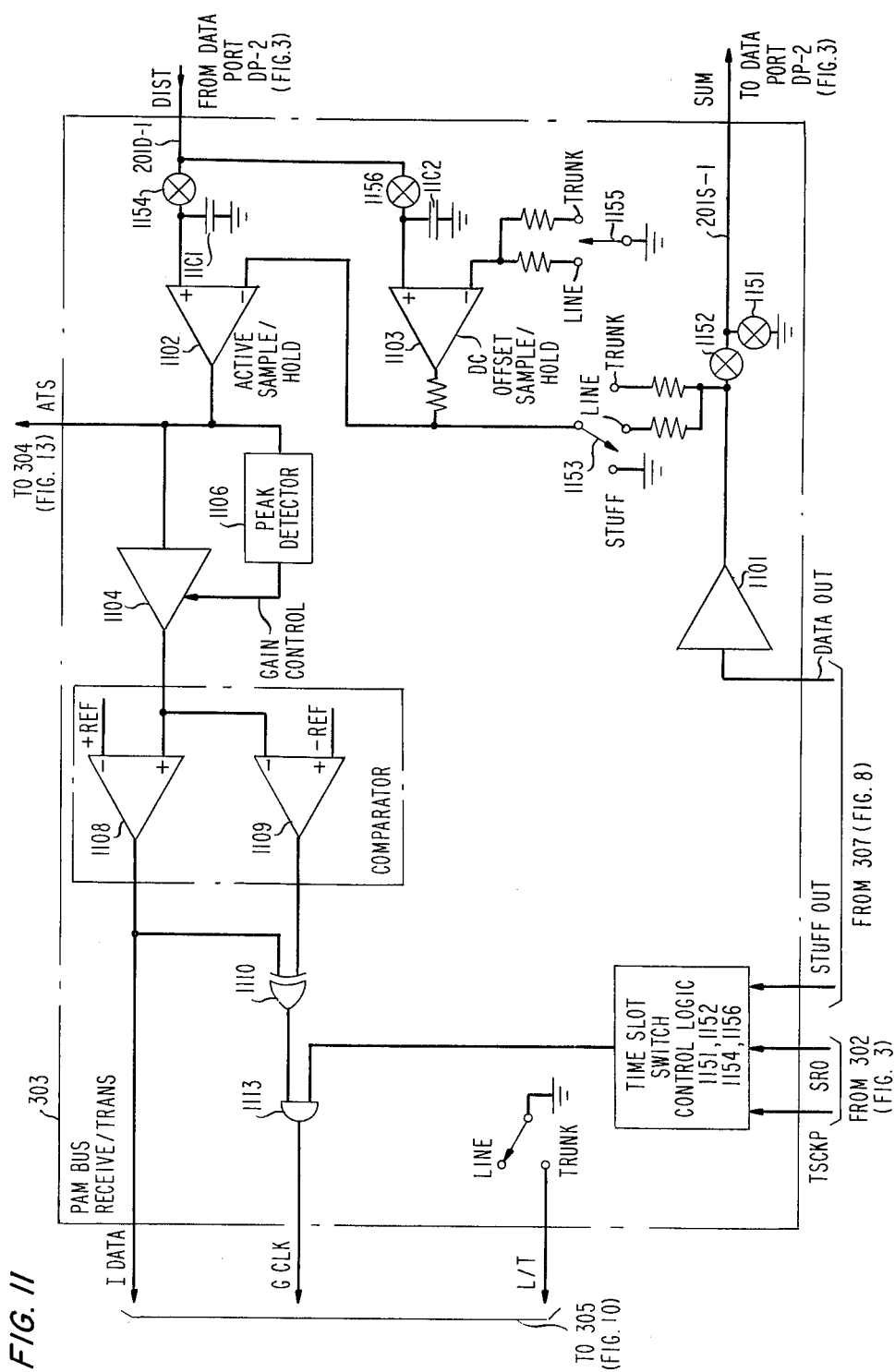
FIG. 11 shows the principal elements of the PBX bus receiver/transmitter of FIG. 3.
Figure 12:
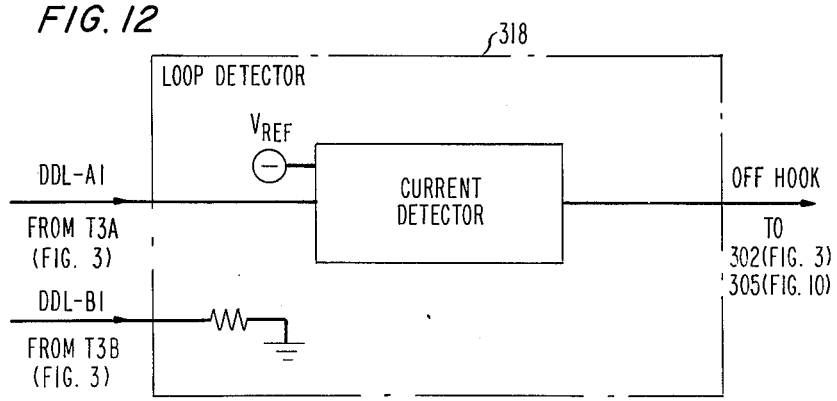
FIG. 12 shows the principal elements of the loop detector circuit of FIG. 3.

In addition, digital port DP-1 includes a tone detector circuit (see FIG. 13) that "listens" to the PBX distribution bus via lead ATS in FIG. 11 for call progress tones. The tone information is sent to digital interface DI-1 over digital data link DDL-A1 multiplexed into the data stream.

Digital interface DI-1 establishes the bit rate on data link DDL-B1 at a multiple of the highest bit rate expected to be employed by the PBX user's data equipment DTE-1, but not higher than the nominal voice sampling rate employed in the PBX 201 switching equipment. The multiple selected is one which will permit transmission both of the PBX user's data at a standardized, synchronous bit rate such as 9,600 bits per second (sync characters being sent in the absence of actual data) and of the requisite control channel information at a sufficient rate, such as 4800 bits per second, properly to maintain the end-to-end communications channel. In the illustrative embodiment, the nominal bit rate on the data link DDL-B1 may be taken to be 14,400 bits per second. Circuitry within data interface unit DI-1 multiplies the clock rate exhibited by data terminal equipment DTE-1 by the appropriate factor to define the nominal link transmission rate of 14,400 Hz.

For example, let it be assumed that data terminal equipment DTE-1 is set to operate at a bit clock rate of 2400 bits per second. The clock rate (2400) is multiplied by 6 to define a digital data link DDL-transmission rate of 14,400 bits per second. To transmit the PBX user's 2400 bits per second data over data link DDL-, a 9600 bit per second data channel on the data link is used leaving a 4800 bits per second channel for control data. A data handling processor in the digital interface unit accumulates the 2400 bits per second data from DTE-1 via a USART and then transmits that data over digital data link DDL- on the 9600 bits per second channel. Since the 9600 bit per second channel is at a higher baud rate than the data from DTE-1, it is necessary to send sync characters between the valid data characters. The 4800 bits per second control channel is always being used independently of the data channel.

In actuality, the clock rate will be subject to a tolerance of $\pm p$ per cent where p is a value that is expected to lie within the applicable CCITT recommendation for user-provided data terminal equipment. The tolerance of $\pm p$ percent gives rise to a bit rate tolerance of $\pm$ delta bits per second. If the clock rate presented by equipment DTE is, for example, 2400 bits per second, circuitry in digital interface DI-1 multiplies the clock rate by 6 to define a digital transmission rate on data link DDL-B1 of 14,400 (plus or minus 6 delta bits per second). Note that the transmission rate in the data link DDL reflects the same variation in bit rate exhibited by the PBX user's data terminal equipment DTE-1.

In order to transport a PBX user's asynchronous start-stop character data delivered to sending end digital interface unit DI-1 at nominal rates from 300 to 9600 bits per second, it is necessary to accommodate the variation that may occur in the user's clock rate to the synchronous data link channel transmission rate of 9600 bits per second. The synchronous data link channel must therefore be capable of handling PBX user character rates that may be substantially higher than the asynchronous input at the nominal rate. In addition, break characters must be transported. At the receiving end of the data channel, the receiving end digital interface DI-2 must receive the synchronous data link channel and adapt it to asynchronous start-stop characters for delivery to data terminal equipment DTE-2 at the rate which is determined by the original asynchronous character rate. This retransmitted character rate will not exceed the nominal rate unless the character rate delivered to DI-1 is, on the average, above the nominal.

In accordance with the principles of the present invention the asynchronous characters presented by a PBX user's data equipment DTE-1 to a digital interface unit such as DI-1 are adapted to the synchronous digital data link channel by operating the synchronous channel in continuous character synchronization and inserting idle characters when necessary. This eliminates the need for continuous start-bit searching of the received synchronous channel and allows transmission of break intervals of arbitrary length by use of a special break character transmitted over the synchronous channel. The start-stop bits of the original characters are stripped and a single character valid bit is appended. The synchronous channel can then support a character rate which is 10% higher than the nominal 9600 bits per second operation.

At digital interface DI-2 at the remote end of link DDL-B2 the characters are extracted. A "servo" system (including DDL timing recovery circuit 230 of FIG. 2, hereinafter described in detail with reference to FIG. 9) detects whether a character overrun condition exists in which characters are taken off link DDL-B2 faster than they are retransmitted by digital interface DI-2 in stop-start asynchronous format to data terminal equipment DTE-2. Upon detection of the overrun condition the retransmission bit rate from DI-2 to DTE-2 is increased until the overrun condition is relieved. In this way the character rate of the retransmitted start-stop characters remains at the nominal unless driven by the original source. This is useful when interfacing to devices such as auto-echo serial ports which cannot tolerate a character overrun condition.

In addition to the variation in the PBX user's nominal data rate a further complication to timing recovery may be occasioned when a PBX switching connection must be established between two modules whose voice sampling clocks are not synchronous. Such a connection may be envisioned with the aid of FIG. 1.

Module "0" of PBX switching equipment 201 includes the two pair of summing and distribution buses 201S-1, 201D-1 and 201S-2, 201D-2. Module "1" of PBX switching equipment includes the two pair of summing and distribution bus 201S-3, 201D-3 and 201S-4, 201D-4. Both module 0 and module 1 perform voice sampling at the illustrative nominal rate of 16,200±0.05% Hz. Because the sampling clocks of the two modules are not synchronized, the actual sampling rate in module "0" may be expressed as 16,200±"alpha" while the actual sampling frequency in module 1 may be expressed as 16,200±"beta". The difference between "alpha" and "beta" gives rise to a jitter frequency component having an instantaneous amplitude proportional to the difference in sampling frequency for the two modules.

Figure 10:
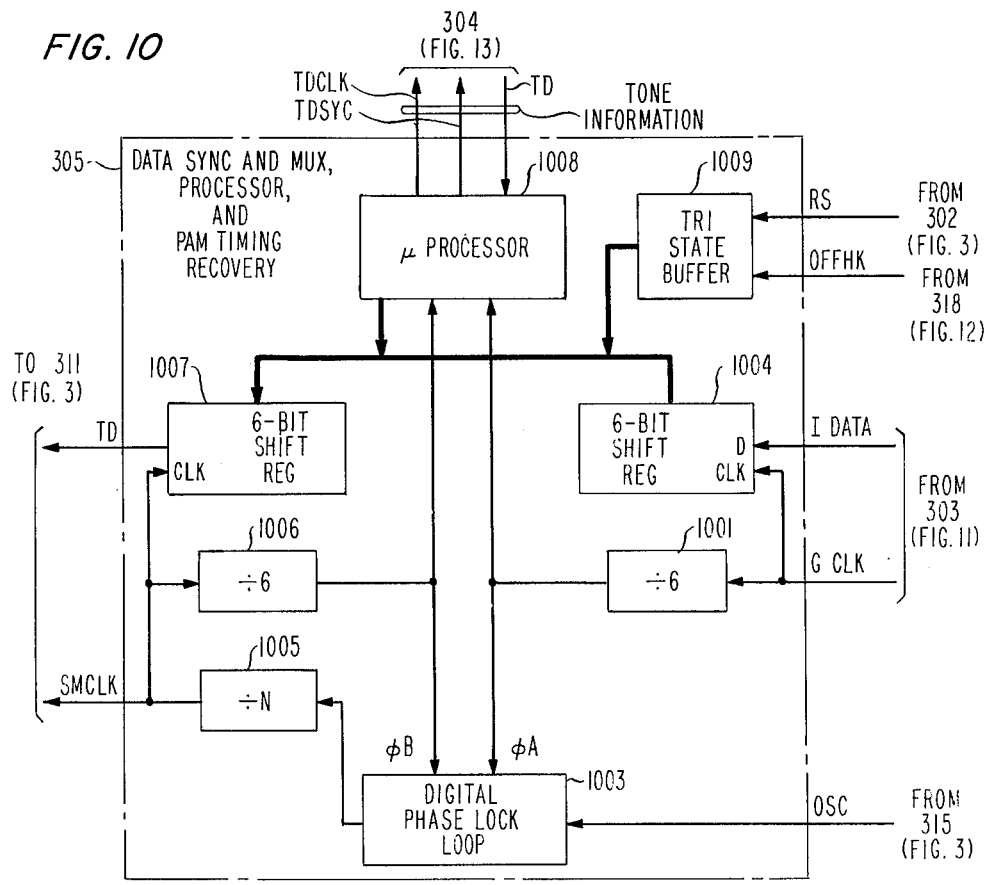
FIG. 10 shows the principal elements of the PBX voice sampling bus timing recovery circuit of FIG. 3.

In the illustrative embodiment, as described hereinafter particularly with respect to the digital port's PBX bus voice sampling bus timing recovery circuit 309 in FIG. 3, the details of which are shown in FIG. 10, the resulting jitter amplitude is reduced to an acceptable level.

When, as hereinafter described, a connection between data terminal equipments DTE-1 and DTE-2 is established by PBX equipment 201 the bits of the PBX user's data and the bits of control information will be interleaved as shown in FIG. 6. In the illustrative embodiment the bits $C_n$ of the control channel are interspersed among every two bits $D_n$ allocated to the PBX user's data. Prior to the establishment of any connection across the PBX, both digital interface unit DI-1 and its associated digital port DP-1 are in the idle state. Digital port DP-1 sends an idle pattern to digital interface DI-1 in both the $D_n$ and $C_n$ bit positions to establish and maintain synchronization on link DDL-B1 between data interface DI-1 and its associated digital port DP-1.

As mentioned above, the $C_n$ bit positions constitute a control channel on the data links. The format of the control channel is shown in FIG. 7.1 and is based on a sequence of three messages: a sync byte (detailed in 7.9), a DDL message byte (detailed in FIGS. 7.7 and 7.8), and an end-to-end message (E-E) consisting of a two-byte or a single-byte "handshaking" message (detailed in FIGS. 7.2 and 7.3) or one of the single-byte control messages (detailed in FIGS. 7.4 through 7.6).

The sync byte of FIG. 7.9 is always transmitted in the first byte of every control frame. In the idle state, synchronization is further maintained by the transmission of a port state message (FIG. 7.7) from the digital port DP-1 to the digital interface DI-1 as the DDL message and by the transmission of the "no connection" message (FIG. 7.6) as the E-E message.

Before a PBX switching connection is set up between terminal equipment DTE-1 or data communications equipment DCE-1 and data terminal equipment DTE-2 or DTE-3, appropriate option switches (222, FIG. 2) of digital interface DI-1 must be set. These option switches identify whether on the particular call digital interface DI-1 will be serving the PBX user's data terminal equipment DTE-1, (as has thus far been assumed) or data communications equipment DCE-1, (as will somewhat later herein be more fully explained), whether the PBX user's equipment will operate in the full or half duplex mode, the speed at which the PBX user's digital data is to be sent and received, whether the data is to be synchronous or asynchronous and whether the timing is to be determined by the local data terminal equipment DTE-1, by the PBX user's remote data handling equipment (DTE-2 or DCE-2), or is to be "free running", i.e., under "internal" control of local digital interface DI-1. All of this information will be exchanged in a series of "handshaking" messages (see FIGS. 7.2 and 7.3) between the digital interface units at each end of the communications connection, once that connection is established through the PBX.

In order for a digital interface unit to be ever-ready to handle actual messages the interface unit, in the idle state even before a PBX connection is established, will constantly be sending the two-byte "handshaking" message of FIG. 7.2. An exemplary handshaking sequence will then comprise seven principal steps. First, the two-byte message of FIG. 7.2 is sent with ACK=0 and SW=0 to indicate that an end-to-end data mode connection has not yet been completed. Secondly, when the local digital interface unit does receive a two-byte message from the far end digital interface, the local digital interface compares with the status of its own option switches the content of the received bytes that indicate the contemplated transmission speed, whether full or half duplex, whether internal, external or slaved synchronization, and whether a connection is contemplated between end-to-end data terminal equipments or data communications equipments.

If the information received is incompatible with the state to which the digital interface has locally been set, the digital interface formulates a "check options" message to its local data terminal or data communications equipment, and formulates a "disconnected" message (FIG. 7.6) for transmission to the remote end. If the two-byte handshaking message received from the far end is compatible to the state to which the local digital interface unit has been set, the local unit responds with a two-byte handshaking message with ACK=1 and SW=0 preliminarily to switching to the data mode. When the local digital interface unit receives a two-byte handshaking message from the far end, with ACK=1, three single-byte handshaking messages (FIG. 7.3) are sent in sequence with ACK=1 and SW=1. Three such messages are sent for reliability. After the third, single-byte handshaking message has been sent and at least one single-byte handshaking message received from the distant mode, the local digital interface unit enters the data mode.

In the data mode further end-to-end messages are continuously exchanged between the digital interface units at each end of the connection, the content of these E-E messages depending on the types of equipment served by each digital interface unit. These further messages are shown in FIGS. 7.4 and 7.5.

If the handshaking sequence is not successful after a predetermined interval such as one minute, the local digital interface sends a "disconnected" user prompt and returns to the idle mode.

In order to facilitate the maintenance of timing synchronization between a digital interface unit and its associated digital port, a form of encoding known as bipolar three-zeros suppression, or B3ZS, is employed on the data links. The format of this code is such that each binary "one" is transmitted as a pulse having a polarity opposite of that of the last pulse sent. A single binary zero is represented by the absence of a pulse. Two successive binary zeros are represented by two successive no-pulse intervals. A series of three successive binary zeros, however, is sent either as two zero intervals followed by a violation, V, of the bipolar coding rule, ("0-0-V") or by a bipolar change, a zero, and then a violation of the bipolar coding rule ("B-0-V"). The choice whether "0-0-V" or "B-0-V" is sent is determined so that the number of bipolar changes between violations is odd in order to make violations alternate in polarity. This prevents a buildup of a DC voltage on the digital link.

Figure 2:
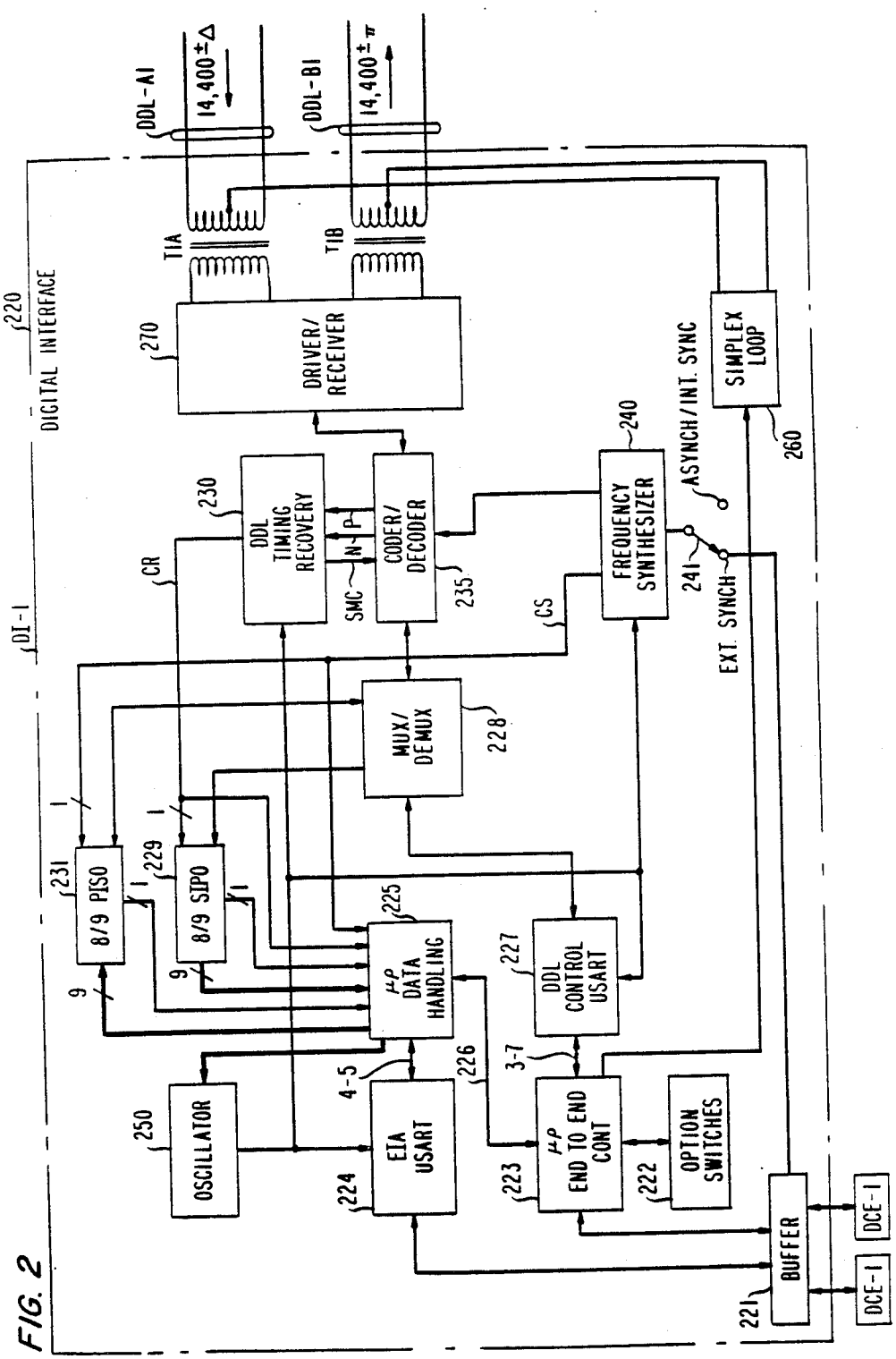

With respect to the user data channel between a digital interface and digital port and which operates synchronously at 9600 bits per second, the synchronous interface includes a serial-parallel converter (SIPO) 229, FIG. 2, and parallel-serial converter (PISO) 231, each capable of handling nine or eight bit characters. Nine bit operation is used when providing 300 to 4800 bits per second synchronous and 300 to 9600 bits per second asynchronous data transport. Eight bit operation is used for 9600 bits per second synchronous data transport. In nine bit operation, eight-bits of user data (eight synchronous bits or one character minus start and stop bits for asynchronous) are loaded along with a bit indicating valid data into parallel-serial converter 231 for synchronous transmission over digital data link DDL-. Since the data channel is synchronous, a character must be loaded every nine bit periods. If there is no user data to be transported, an idle character code, which has the valid bit clear, is sent. In addition, asynchronous data transport uses a special break character, which is a nine bit character tagged as invalid data. The special break character is different from the idle character. Nine-bit characters are received over digital data link DDL- via serial-parallel converter 229 every nine bit periods at which time the character is examined to determine if it is valid user data, idle, or a break command. When eight-bit operation is used for 9600 bits per second synchronous transport, user data is transmitted and received every eight clock periods with no idle periods, and in fact, no character synchronization.

The special break character employed in transporting start-stop asynchronous serial data over digital data link DDL- consists of a start bit at the spacing level, a number of data bits at the spacing level (for a digital interface unit, eight), and a stop bit held at the spacing level rather than the usual marking level. Since asynchronous characters are transmitted from the local digital interface unit to the remote digital interface unit (DI- to DI-) as an eight-bit character plus a valid bit, more information is needed to transmit the break condition than an all-zero character. To transmit a break, a unique nine-bit character is sent to the remote digital interface unit causing a continuous spacing level (break) to be retransmitted for as long as the originally received asynchronous serial stream is held at the spacing level.

DETAILED DESCRIPTION

Figure 3:
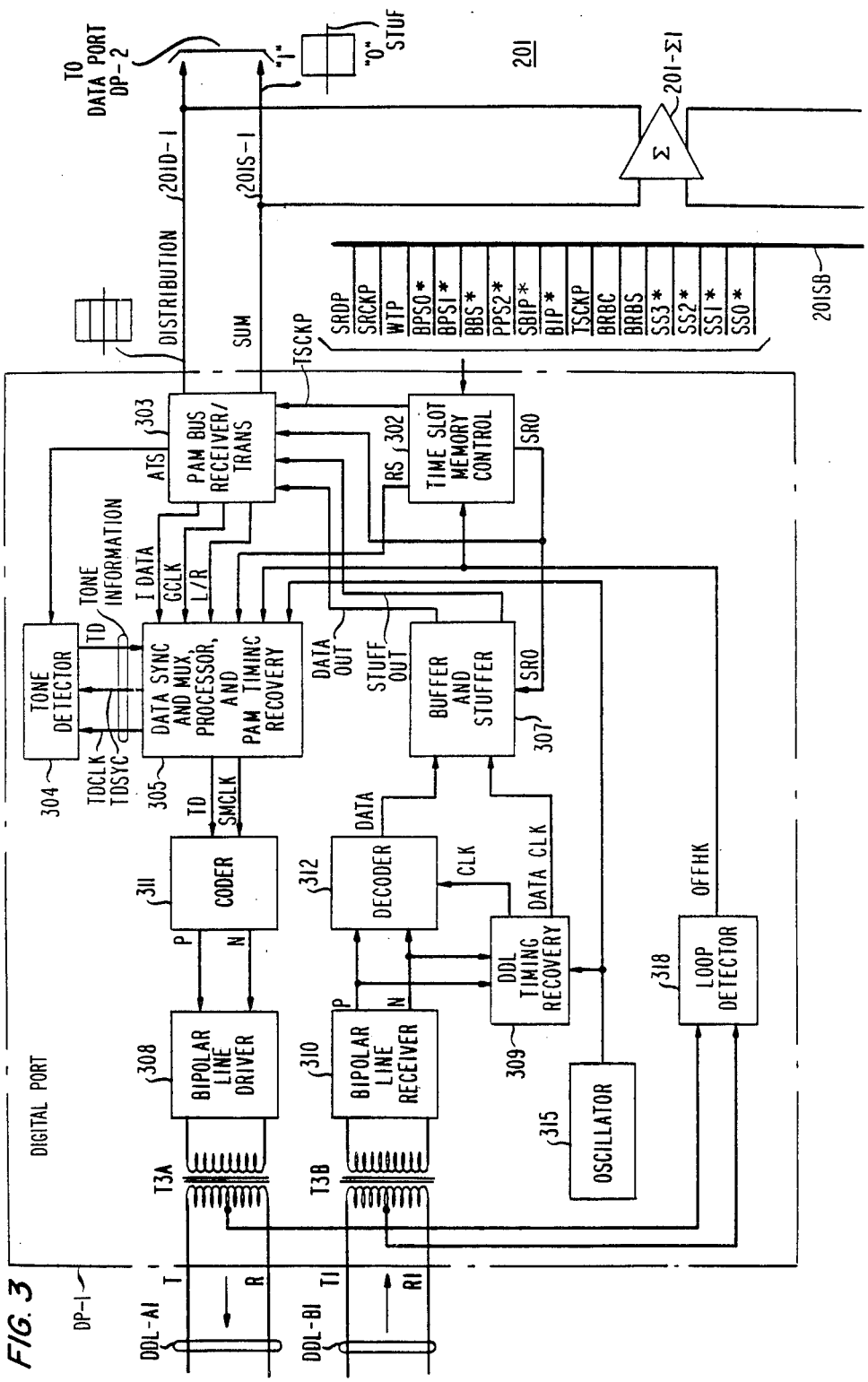

FIGS. 2, 3 and 4 arranged as shown in FIG. 5 of show the major circuit elements of digital interface DI-1 and of digital port DP-1 for transporting the PBX user's digital data and the end-to-end control information for recovering timing signals and for maintaining synchronization on the data links. Timing on the data links is derived by locking frequency synthesizer 240 to crystal oscillator 250 in FIG. 2. Synthesizer 240 includes a programmable divider (not shown) controlled by microprocessor 223 via DDL control USART 227. Frequency synthesizer 240 may operate in the asynchronous mode when switch 241 is thrown to the "no connection" (ASYNCH/INT. SYNC)position or in the synchronous mode when switch 241 is thrown to the "external-synchronous" (EXT. SYNCH)position. In the external sync mode synthesizer 240 produces a clock which is that multiple of the actual data rate employed by the PBX user's data terminal equipment as will cause it to generate a clock at the nominal bit rate of 14,400 bits per second.

When the PBX user places data terminal equipment DTE-1 in the calling state preparatory to "dialing up" a PBX connection, a "data terminal ready-on" condition will be exhibited at its parallel-lead EIA interface to buffer 221. Digital interface unit DI-1 will respond at buffer 221 with the expected "clear-to-send" (CB), "data-set-ready" (CC), and "receive line signal detect" (CF) conditions in the "on" state. Digital interface DI-1 is now in the call set-up mode. The data terminal equipment user may then press either the break key or the originate/disconnect function key at terminal DTE-1.

The BREAK-initiated calling condition is detected by buffer 221 which is connected to universal, synchronous/asynchronous, receiver-transmitter (EIA USART) 224. EIA USART 224 detects the break condition exhibited to buffer 221 and, in response thereto, signals end-to-end microprocessor 223 advantageously via a microprocessor "port" pin (not shown). End-to-end microprocessor 223, polling these lines then activates simplex loop supervision circuit 260 to close the loop that applies simplex loop current over links DDL-A1 and DDL-B1 via the center taps of transformers T1A and T1B.

Before proceeding further with call set-up it would be well briefly to describe the functions performed by microprocessors 225 and 223. In general, data handling microprocessor 225 acts as the input/output processor for end-to-end microprocessor 223, controls EIA USART 224, and sends three types of messages over interprocessor path 226 to microprocessor 223: (a) the dialed digits (ASCII or BCD); (b) an acknowledgement of a message received from microprocessor 223, and (c) a data error message during loop-back or self-test operations. End-to-end microprocessor 223 sends the following types of messages to microprocessor 225: (i) the ASCII character (user-prompt) to be displayed at the PBX user's data terminal equipment's CRT; (ii) the status of option switches 222 so microprocessor 225 can properly program EIA USART 224; (iii) BCD line control information such as defined in EIA standard RS-366 which includes Data Line Occupied (DLO), Call Origination Status (COS) and Abandon Call and Retry (ACR). DLO is turned ON when in the Call Set-up Mode; COS is turned ON when the calling equipment has completed its call origination functions and control has been transferred from the RS-366 lines to the RS-232 lines; ACR is turned ON when a busy, reorder, or intercept tone is detected; In addition, microprocessor 223 also sends to microprocessor 225 (iv) a command to get a BCD digit; (v) a command to "slip" a bit position in order to attempt to acquire character synchronization on the data link control channel; (vi) a forced BREAK command to be executed by EIA USART 224; and (vii) a remove BREAK command.

End-to-end microprocessor 223 performs seven minor routines in addition to EIA handling routines. The EIA handling routines are divided into two categories determined by whether option switches 222 have been set to instruct the digital interface to serve a PBX user's data communications equipment or data terminal equipment, DCE-1 and DTE-1, respectively. There will be a routine for monitoring the EIA interface presented to buffer 221 in the idle state, in the call set-up state, to perform handshaking across the EIA interface and to either transport the PBX user's digital data in the transparent mode or to perform a modem emulation.

In addition to the EIA handling routines, end-to-end microprocessor 223 will include a routine for monitoring the BREAK contact of the PBX user's data terminal equipment ("POLBRK"); a routine for monitoring the originate/disconnect button of the PBX user's data terminal equipment for on/off-hook control ("POLOD"); a routine to control out-pulsing ("OUTPLS"); a routine to control RS366 dialing if an automatic calling unit type of data terminal equipment is connected by the PBX user to buffer 221 ("BLDCTL"); a routine to establish synchronization of the data link control channel with the associated data port ("POLSYN"); a routine to maintain the current mode of operation such as the handshaking over the control channel of the data link with the associated digital port ("EECTL"); and lastly, a routine which monitors for control channel codes indicating the appearance of tone or ringing by the PBX ("DDLCTL"). Routines which will control testing of the board and loopback functions may also be included.

In addition to the normal, cyclicly-performed routines mentioned above, end-to-end microprocessor 223 is capable of responding to four types of interrupt: an interrupt from DDL control channel USART 227 ("RCVINT"); an interrupt to send out one of the end-to-end messages of FIGS. 7.2 through 7.6 ("XMTINT"); an interrupt to permit communication between microprocessors 223 and 225 ("DHTOEE"); and a timer controlled interrupt for controlling various timers ("TIMCNT"). For convenience, the entry conditions and actions of the foregoing programs will now briefly be summarized:

POLBRK
  Entry Conditions:
    Digital interface unit and Data Port unit are in synchronism ("SYNCed"), ASCII dialing is enabled, asynchronous operation set. If in Data Mode, "Disable Break" option is not set.
  Actions:
    1. Poll for break key pushes and releases.
    2. Break pushes timed appropriately.
    3. If Break pushed long enough, switchhook toggled.
    4. When Break released after being pushed send "DISCONNECTED" prompt for on-hooks.
    5. Offhooks are allowed only after 3 sec. IDLETIMER has timed-out unless there is an incoming call.

POLOD
  Entry Conditions:
    "SYNCed", (See POLBRK)
  Actions:
    Same as for POLBRK.

TIMCNT
  Entry Conditions:
    Timer 1 overflow interrupt.
  Actions:
    1. Decrement IDLETIMER if >0.
    2. Increment "real time" counter word TH2/TL2 used with end-to-end microprocessor internal timers TH1/TL1 to provide a relative sense of time. These 4 byes of information cycle every 35 minutes.

POLSYN
  Entry Conditions:
    Attempting to establish "SYNCed" (See POLBRK)
  Actions:
    1. SYNCTIMER checked for 32 ms time-out.
    2. If timed-out, send "Slip Bit" message to data handling microprocessor 225.

RCVINT
  Entry Conditions:
    Receiver Ready interrupt from DDL control channel USART 227.
  Actions:
    1. Maintain Synchronization. (If 3 consecutive SYNCing errors go to Resync; If 3 consecutive valid frames detected "SYNCed" is established.)
    2. Check parity of message received over data link
    3. Store byte in appropriate buffer DDLCTL
  Entry Conditions:
    A byte has been stored in data link buffer for data link control channel DDL message. See FIGS. 7.7–7.8)
  Actions:
    1. Look for tones and ringing.
    2. Send appropriate message if possible (i.e. RINGING, BUSY, etc.)
    3. Set appropriate tone bit in memory.
    4. Check for ringback removal and initiate FLASH if option switch set.

EECTL
  Entry Conditions:
    A byte has been stored in buffer for end-to-end control channel messages (See FIGS. 7.2–7.6)
  Actions:
    1. Maintain "MODE" of operation.
    2. During handshaking mode, control handshaking algorithm.
    3. During data mode, store data from EERCVBUF in EIA queue.

DHTOEE
  Entry Conditions:
    Serial Port Receive Interrupt and in Call Set-up/ASCII, Idle/BCD, or Self-Test Mode.
  Actions:
    Call Set-up/ASCII Mode
    1. Parity of character checked; if parity bad, (BELL) sent to CPT.
    2. Character echoed if Full Duplex.

3. Character stored in outpulsing buffer if possible; if buffer >20, send (BELL) to CPT=increment OVERFLOW byte.
4. Act on character.

OUTPLS

Entry Conditions:
ASCII or BCD Mode.
Actions:
1. If a character is currently to be outpulsed (i.e. a number >0 in current digit byte CURDIG), handle outpulsing.
2. Check OPSTS for outpulsing enabled.
3. If OPSTS=1, check timer for interdigital time-out.
4 After interdigital time, get next digit.
5. If digit=1-13, outpulse. If digit='-', set for long interdigital time. if digit=DIAL2, wait for dial tone. if digit=CONTROL F, Flash.

Figure 15:
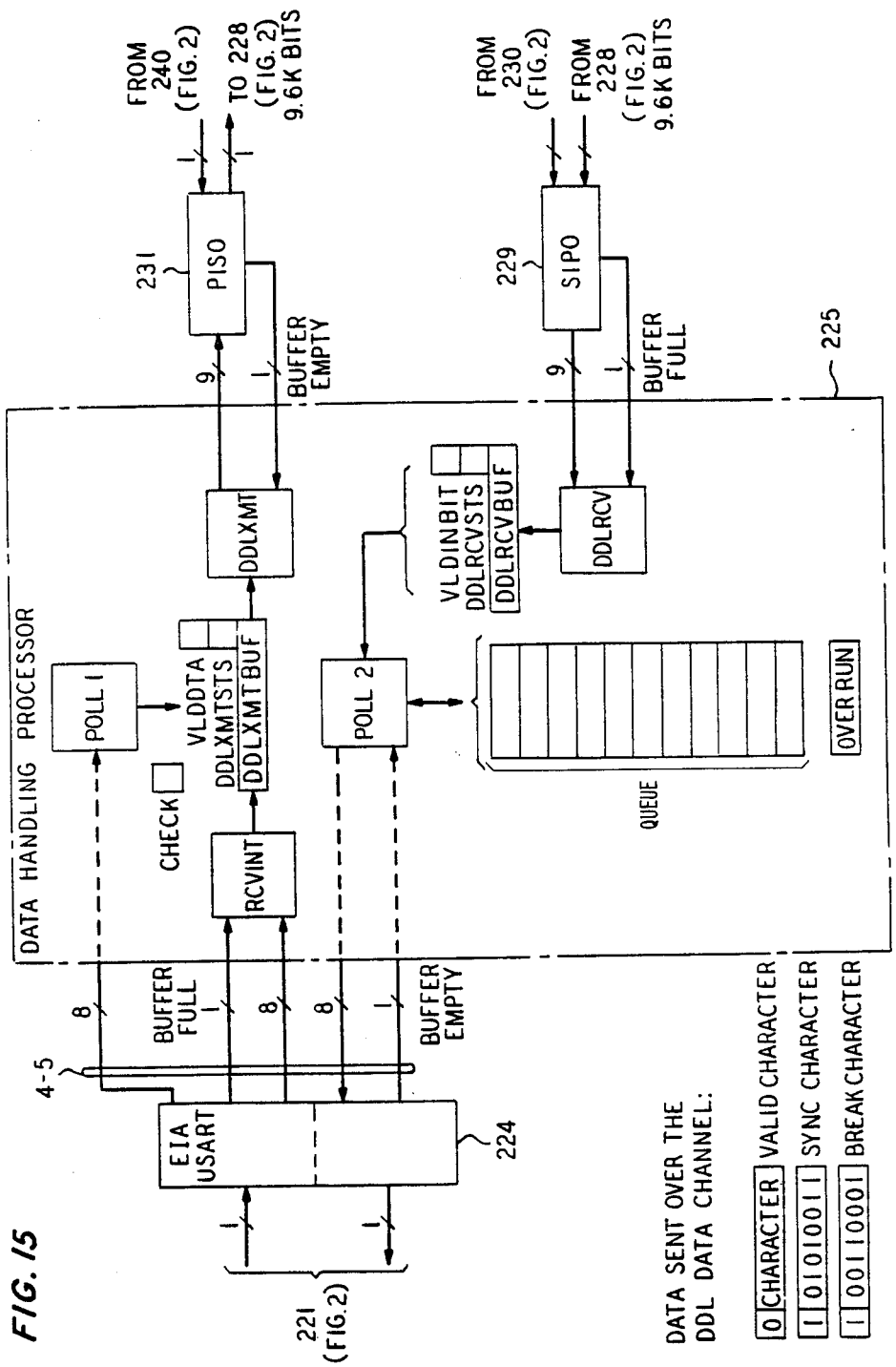
FIG. 15 shows the relationship among the principal processes performed by the microprocessor of the digital interface of FIG. 2 when handling asynchronous data.

Handling of Asynchronous Data - 300, 1200, 2400, 4800 & 9600 BAUD (REFER TO FIG. 15)

During the Data Mode, the RCVINT routine previously mentioned handles the USART "Receiver Ready"interrupt. If the USART has detected an error in the data (i.e. parity, framing, etc.), RCVINT ignores the data. If a BREAK condition is detected by the USART, the RCVINT routine stores a "BREAK character" in the DDLXMTBUF register, sets the VLDDTA bit for invalid data (=1), and sets the DDLXMTSTS bit to indicate data for the DDLXMT routine. It also sets bit EIABRK for use by the POLL1 routine; this bit indicates that a BREAK has been detected. If no BREAK or errors are detected, the RCVINT routine simply stores the received character in DDLXMTBUF, sets the VLDDTA bit for valid data (=0) and sets the DDLXMTSTS bit to indicate data for the DDLXMT routine.

The DDLXMT routine (see FIG. 15) handles the "buffer empty" interrupt generated by the parallel in-/serial out shift register (PISO). This interrupt occurs after 9 bits have been shifted out of the PISO. If there is no data to transmit (DDLXMTSTS=0), the DDLXMT routine writes a SYNC character to the PISO with the 9th data valid bit set to 1 for invalid data. If there is data to be sent, DDLXMT writes the character in DDLXMTBUF appended with the VLDDTA bit to the PISO.

The POLL1 routine (see FIG. 15) is executed only if a BREAK has been detected (EIABRK=1). This routine is responsible for maintaining the DDLXMTBUF register and filling it with BREAK characters for the duration of the BREAK condition. If DDLXMTSTS=0, meaning that the DDLXMTBUF is empty, POLL1 looks at the USART status register to see if a BREAK is still active. If there is a BREAK, DDLXMTBUF and VLDDTA are loaded with the BREAK character and DDLXMTSTS is set to a 1. If there is no BREAK, the EIABRK bit is cleared to a 0.

The DDLRCV routine (see FIG. 15) handles the "buffer full" interrupt generated by the serial in/parallel out shift register (SIPO). This interrupt will occur after 9 bits have been shifted into the SIPO during normal operation; it will occur after 1 bit has been shifted into the SIPO during the SYNCing operation. If the data handling processor is in the "SYNCing" state (i.e. looking for a SYNC character), the "buffer full" interrupt will occur as every bit is received by the SIPO. The DDLRCV routine looks at the data in the SIPO. If the data is not a SYNC character, nothing is done. If the data is a SYNC character, the "SYNCing" state is exited and the "buffer full" interrupt is adjusted to cause an interrupt for every 9 bits input by the SIPO. If the DH processor is handling asynchronous data or synchronous data less than 9.6 baud, interrupts will occur after the reception of a 9 bit data character. This character is stored in DDLRCVBUF and VLDINBIT and the DDLRCVSTS bit is set to indicate data for the POLL2 routine.

The POLL2 routine (see FIG. 15) handles the queue for asynchronous data and synchronous data less than 9.6 baud, and the output of asynchronous data to the USART.

Input of Data:

If there is data in DDLRCVBUF (DDLRCVSTS=1), POLL2 checks that data. If it is valid data (VLDINBIT=0), that data is stored in the DDLINBUF circular queue. POLL2 also will check to see if a SYNC has been seen in the last 20 characters input. If it hasn't, POLL2 realizes that the DH processor is out of data sync and will enter the "SYNCing" state. If the data is a SYNC character, the counter counting characters between SYNCs is zeroed. If the data is a BREAK character and there is no data to be sent to the USART, a BREAK is forced. This BREAK will be removed when either a SYNC or a valid character is received over the DDL data channel. Except in the case of overrun then, the length of a sent BREAK is maintained on the receiving end within the margins specified by the DDL9.6 Kbit rate.

Output of Data:

If the USART "buffer empty" flag is active and there is data in the queue, a data byte is sent out to the USART. If the queue has more bytes than the number stored in register OVERRUN, the transmit clock rate is increased by 0.4% and the number in register OVERRUN is incremented by 1. OVERRUN is initially set to 3 bytes by data handling processor 225. So if EIA USART 224 is outputting characters to DTE-1 at 2400 baud and the queue contains more than 3 bytes, the baud rate is increased to 2400+2400. (0.004) by increasing the oscillation rate of oscillator 250 and OVERRUN is incremented by processor 225 to 4 bytes. If the queue contains less than OVERRUN-2 bytes and the baud rate is operating above the nominal, the transmit clock rate is decreased by 0.4% and OVERRUN is decreased by 1.

The above servo arrangement scheme acts to throttle data and can handle a temporary overrun condition easily.

HANDLING OF SYNCHRONOUS DATA - 300, 1200, 2400, & 4800 BAUD (REFER TO FIG. 16)

Figure 16:
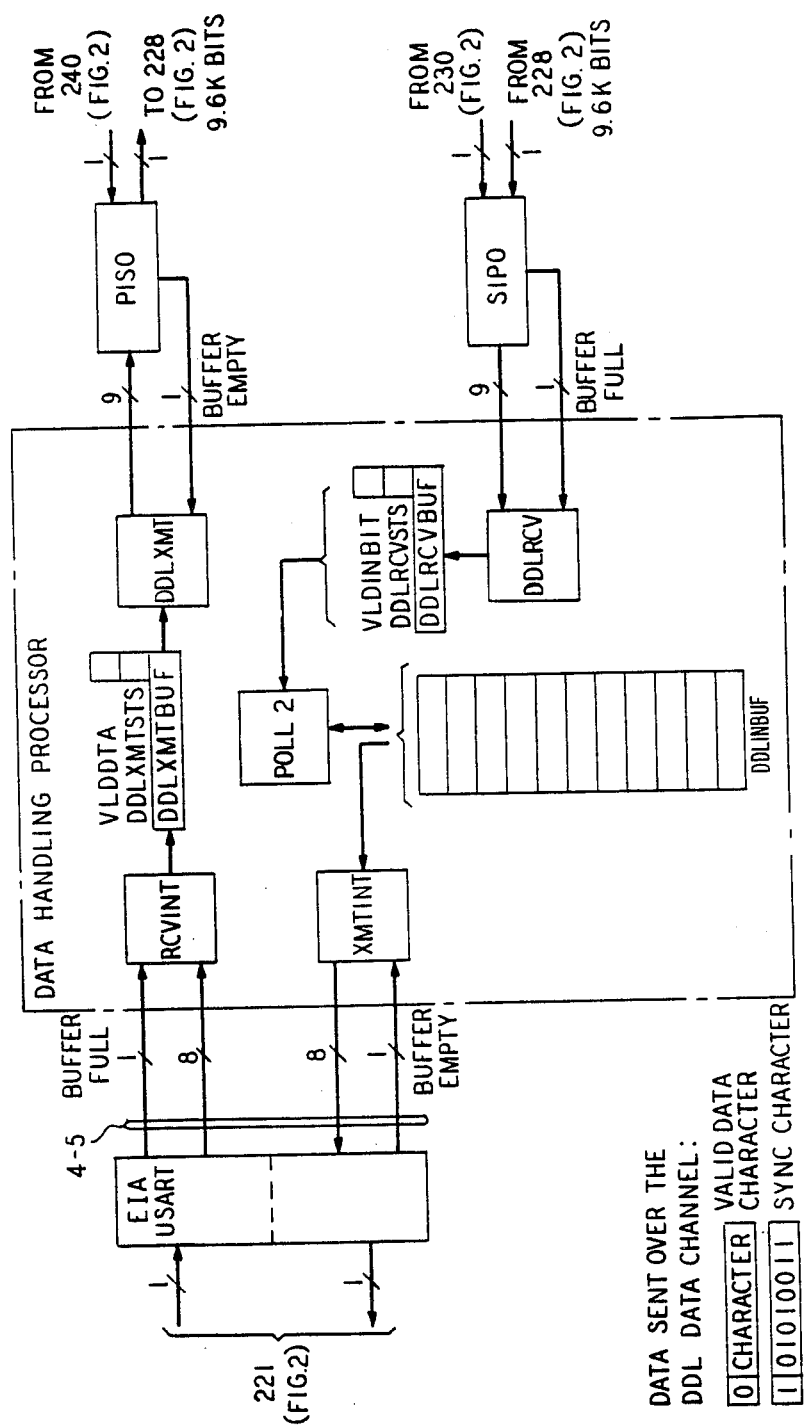
FIG. 16 shows the relationship among the principal processes performed by the microprocessor of the digital interface of FIG. 2 when handling synchronous data below 9600 baud.

The RCVINT routine (FIG. 16) handles the USART "Receiver Ready" interrupt. The RCVINT routine stores the received character in DDLXMTBUF, sets the VLDDTA bit for valid data (=0), and sets the DDLXMTSTS bit to indicate data for the DDLXMT routine. The DDLXMT and DDLRCV routines operate in basically the same fashion as described above in connection with FIG. 15. The POLL2 routine of FIG. 16 handles the queue for asynchronous data and synchronous data less than 9.6 baud.

Input of Data:

If there is data in DDLRCVBUF (DDLRCVSTS=1), POLL2 checks that data. If it is valid data (VLDINBIT=0), that data is stored in the DDLINBUF circular queue. POLL2 also will check to see if a SYNC has been seen in the last 20 characters input. If it hasn't, POLL2 realizes that the DH processor is out of data sync and will enter the "SYNCing" state. If the data is a SYNC character, the counter counting characters between SYNCs is zeroed. The XMTINT routine (FIG. 16) handles the USART "transmitter empty" interrupt. Data in the queue is output to the USART.

HANDLING OF SYNCHRONOUS DATA - 9600 BAUD (REFER TO FIG. 17)

Figure 17:
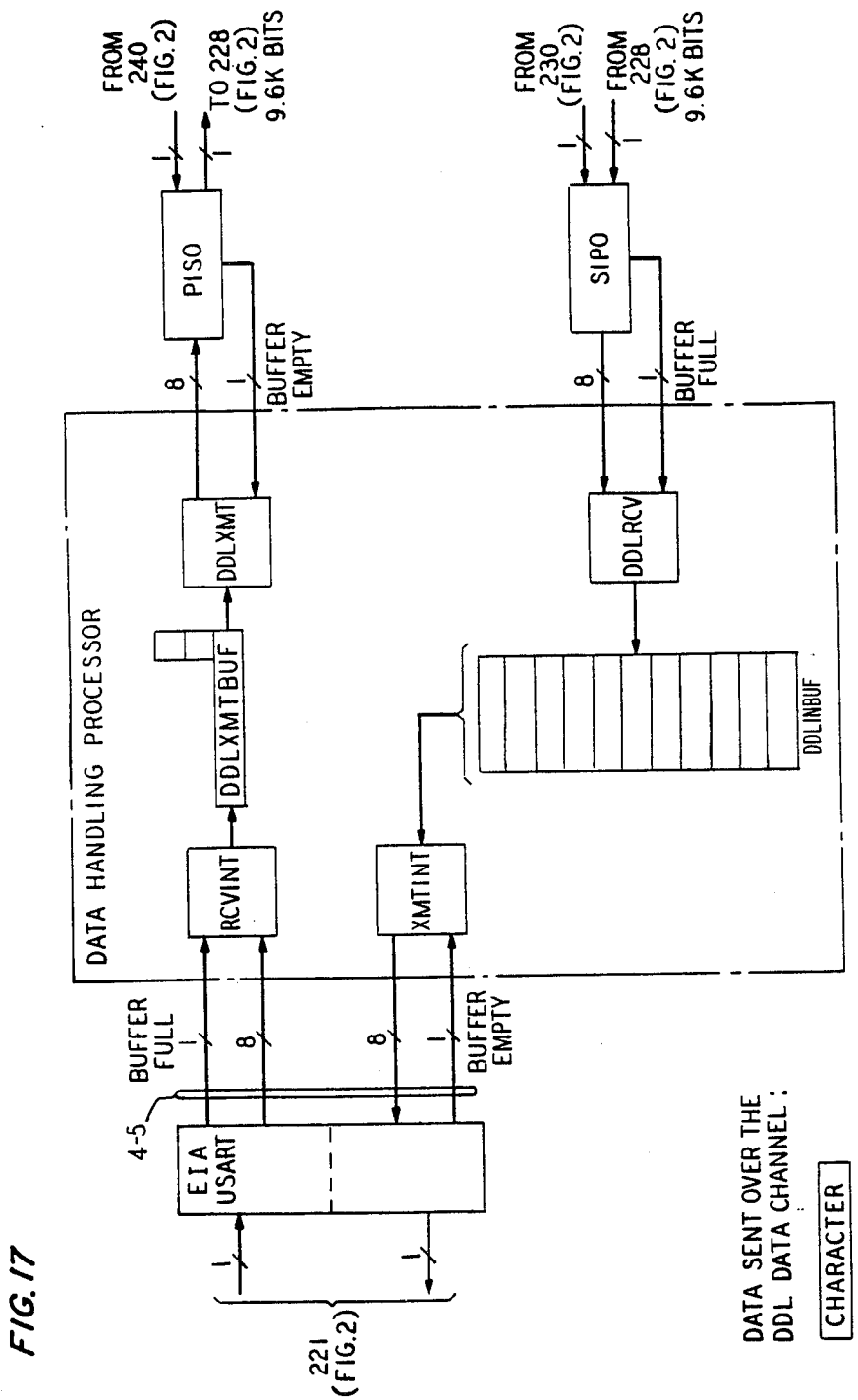
FIG. 17 shows the relationship among the principal processes performed by the microprocessor of the digital interface of FIG. 2 when handling synchronous data at 9600 baud.

The RCVINT routine (FIG. 17) stores the received character in DDLXMTBUF and sets DDLXMTSTS to 1. For synchronous 9.6 Kbit operation, the DDLXMT routine will be invoked after 8 bits of data have been sent over the DDL data channel. This routine simply transfers the data from DDLXMTBUF to the PISO. The DDLRCV routine is invoked after 8 bits have been received by the SIPO. DDLRCV inputs the data and stores it directly in the DDLINBUF queue. The XMTINT routine takes data from the queue and outputs it to the USART. It should be noted that for synchronous 9.6 Kbit data is passed totally transparently through the DH processor.

Digital Port DP-1 (FIGS. 3 and 8 through 14)

The digital port appears in a "port carrier" (not shown) in the PBX switching equipment and serves to provide the digital data link DDL- with two types of interfaces to PBX switching network 201. One interface, provided by PBX voice sampling PAM bus receiver/transmitter 303 in FIG. 3, works with the three level PBX user's data signal (five level for full duplex operation) on the SUM and DIST bus leads 201S-1, 201D-1 of the PBX voice sampling bus and the other interface, provided by time slot memory control 302, provides the various time-slot control and scan signals that provide port control and status information. In addition, various power and ground connections (not shown) are provided to the digital port by the PBX.

The details of PBX voice sampling PAM bus transmitter/receiver 303 are shown in FIG. 11. Transmitter/receiver 303 operates basically as described in the above-mentioned copending application of D. A. Spencer, now U.S. Pat. No. 4,398,287. Briefly, however, receiver/transmitter 303 herein corresponds to data port 208 of U.S. Pat. No. 4,398,287, time slot switches 1152 and 1154 herein correspond to time slot switches 116' and 117'; and differential amplifiers 1101 and 1102 herein correspond to differential amplifiers 212 and 213. Transmitter 1101, together with switch 1151, translates the logic levels of the data to the appropriate bus level (+1.58V (OdBm) for a logical one, −1.58V for a logical zero, and 0.0V for a "stuff" indication.) At its "+" input amplifier 1102 samples and holds the sum of the PBX-user's digital signals from the near and far end that appear on the DIST bus. At its "−" input the PBX user's digital signal from the SUM bus (near end) and the DC offset of the PBX voice sampling bus (ascertained during the preamble portion of the time slot) are subtracted-out so that the output of amplifier 1102 contains just the signal from the far end. Since the round trip gain through the PBX varies depending on whether the digital port "board" is in a line or trunk carrier, the hybrid balance (the amount subtracted off) has to change depending on which carrier in which the board is located. This is achieved by setting the line/trunk option switches 1153, 1155 to the desired state to reconfigure the circuit as required. Since PBX gain is different for line to line and line to trunk connections the gain of stage 1104 is controlled by the output of peak detector 1106 which detects the peak value of the signal taken from the PBX bus and sets the gain for the existing case.

In addition to the elements described above as corresponding to certain elements of the port of U.S. Pat. No. 4,398,287, receiver/transmitter 303 hereof includes comparators 1108, 1109, Exclusive-OR de-stuff gate 1110, positive and negative reference voltage sources, (±1.5V) and clock blanking gate 1113. Comparators 1108, 1109 and gate 1110 cooperate to distinguish the zero-level (stuff) signal when it appears on bus DIST during a time slot.

Time Slot Memory and Control 302

A general description of circuit 302 in FIG. 3 and of scanner bus 201SB may be found in D. G. Medill, U.S. Pat. No. 3,789,154 issued Jan. 29, 1974 and in J. M. Elder U.S. Pat. No. 3,934,099 issued Jan. 20, 1976. The main functions of circuit 302 are to provide time slot control signals and provide scan information to and from the PBX. The active time slot is defined by the placement of a bit in a recirculating 64 bit shift register (not shown) that generates a shift register output (SRO) signal approximately 1 microsecond long every 64 microseconds. This signal controls the time slot switches 1151, 1152, 1154 and 1156 (FIG. 11) which gate outgoing signals onto the SUM bus and incoming signals from the DIST bus during the assigned time slot. The bit in the shift register is set by signals from the network control board in the PBX, and is read back via the selected busy/idle port (SBIP*) and busy/idle port (BIP*) leads shown in FIG. 3 for auditing purposes, and for controlling the PAM bus routine switches, respectively. The port is alerted to an incoming call (ring state) when the PBX common control 201CC activates the ring bit set (RBS) lead. The ring state is cleared by the 201CC activating the ring bit clear (RBS) lead.

The information provided by the digital port to PBX bus 201SB includes switch-hook status bits SS0*, SS1*, SS2* and SS3*. For digital port boards appearing in line carriers, bits SS0* and SS1* provide an on/off hook state condition for each port on the board, leads SS2* and SS3* being tied high. For port boards appearing in trunk carriers, lead SS0* provides on/off hook information and lead SS1* provides ring state information for port "0" of the board. Similarly, leads SS2* and SS3*, respectively, provide on/off hook and ring state information for port "1"of the board. The switching of these modes is done by one of the line/trunk option switches (not shown) on the digital port board.

The digital port includes a bipolar line driver 308 and a bipolar line receiver 310, associated with outgoing digital data link DDL-A1 and incoming digital data link DDL-B1, respectively. Bipolar line driver 308 may advantageously be the Western Electric type 604BW device that was developed for D4 channel banks. This device takes positive (P) and negative (N) logic signals and converts them into positive and negative pulses that are appropriately shaped for transmission. Bipolar line receiver 310 transforms the pulses arriving over data link DDL- to P and N logical signals and may advantageously be a Western Electric type 605CY device which automatically compensates for transmission line losses to 31 dB at half the transmission bit rate in digital data link DDL-.

Coder/decoder 311, 312 in FIG. 3 converts the data and clock to P and N signals using a bipolar 3-zero suppression (B3ZS) coding which provides a minimum of at least one logical one for every two zeros on digital data link DDL-.

In order to avoid burdening the control channel with the need to carry ASCII terminal dialing information, off-hook and on-hook dialing states are represented by DC loop current controlled by switching of the applied battery across the center taps of transformers TIA, TIB (FIG. 2) by digital interface DI- and detecting the resultant loop current at the center taps of transformers T3A, T3B, FIG. 3 in loop status circuit 318 (detailed in FIG. 12) in the digital port DP-. The resulting on/off hook status is used to signal PBX bus 201SB via time slot memory/control 302, and microprocessor 1008.

Incoming Data Handling

Data received from the PBX distribution, bus 201D must be processed by the digital port DP before it is transmitted over digital data link DDL- to data interface DI-. This processing includes the operation of data sync and mux, processor and PAM timing recovery circuit 305 (detailed in FIG. 10), which recovers the 14.4 kHz timing on the de-stuffed data, and extracts a synchronizing signal for multiplexing the incoming digital data and digital port-to-digital interface information (FIG. 7.7) onto digital link DDL-.

Data sync and mux, processor and PAM timing recovery circuit 305 recovers the 14.4 kHz data clock by suppressing the 16.2 kHz time slot clock during the stuffed time slots. As shown in detailed block diagram FIG. 10, the gapped 16.2 kHz PBX voice sampling clock is received and applied to phase locked loop timing recovery circuit 1003 which generates a smoothed 14.4 kHz clock for use in sending the data to the DDL. The timing recovery circuit is implemented so that it will "free run" at 14.4 kHz with no input signal. This clock maintains the digital data link control channel in synchronism before a connection through the PBX is established.

FIG. 10 also includes circuitry for extracting a synchronization signal from, and multiplexing data port-to-data interface (DP- to DI-) information into, the digital data link stream. Microprocessor 1008 controls data manipulation. The data is buffered on the input side of the processor by six bit shift register 1004 which is controlled by the de-stuffed (gapped) 16.2 kHz clock. On the output side, data is buffered by six bit shift register 1007 which is clocked by the smoothed 14.4 kHz clock from the PAM bus timing recovery circuit.

Figure 14:
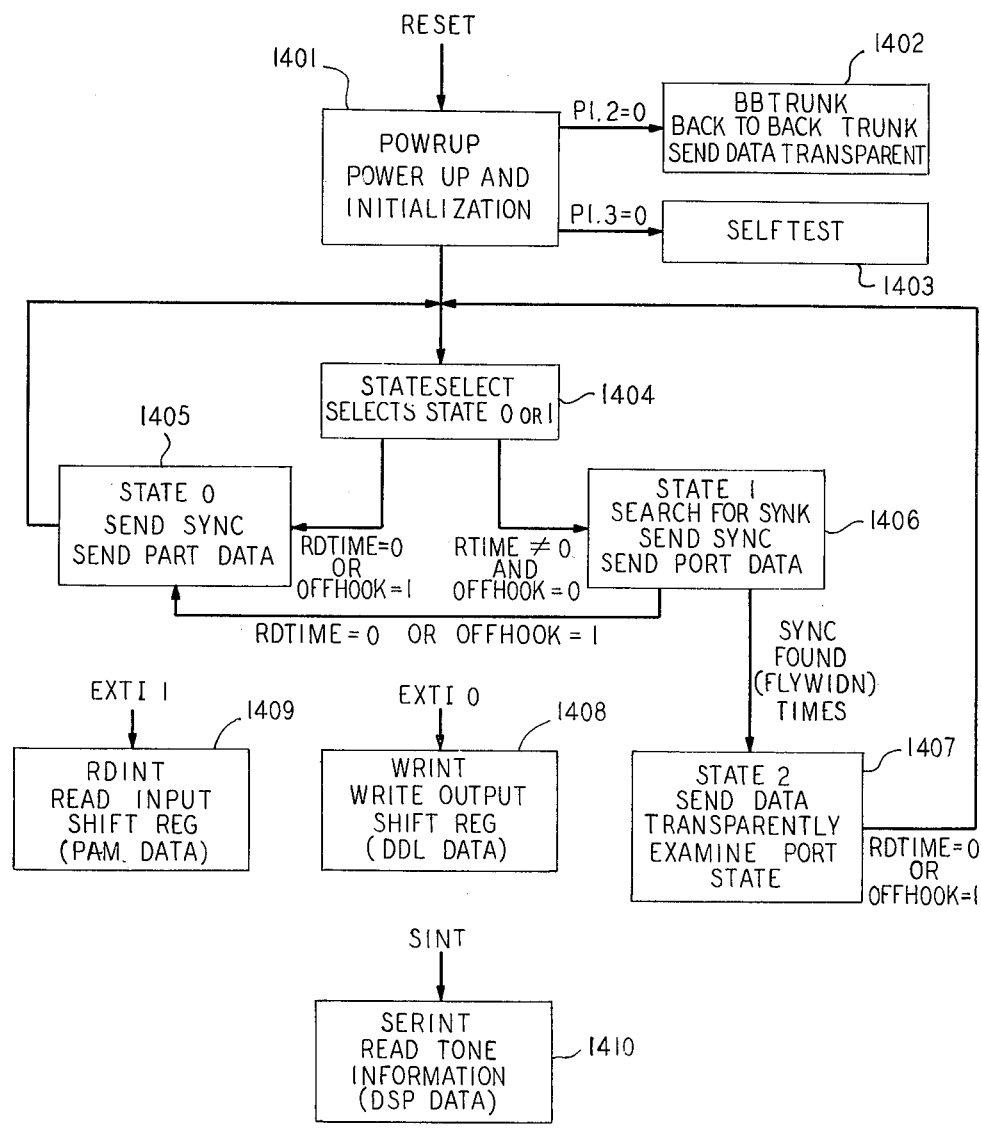
FIG. 14 shows the relationship among the principal processes performed by the microprocessor of the digital port of FIG. 3.

The data is read from input 6-bit shift register 1004 by read interrupt routine 1409 (FIG. 14). The interrupt routine, generated by the divide-by-6 counter 1001, is entered after every six bits are loaded into 6-bit shift register 1004. Output shift register 1007 is written to by the write interrupt routine 1408 in a similar manner. Since the read and write interrupt signals are the two phase inputs to phase lock loop 1003, they are held nominally 180 degrees out of phase, thus preventing an overrun of the output data by the input data.

Registers 1004, 1007 and processor 1008 form an elastic store for the data coming from the PAM bus. The six bit register size was chosen as an advantageous compromise between hardware and software using the given modulo-3 format on digital data link DDL.

The six bit register size was chosen for two reasons; first it had to be a multiple of three because of the module-3 DDL format, i.e. the control channel bit appears as every third bit on data link DDL-, and second the largest possible size is desired to reduce the percentage of overhead involved in handling the data. Since the microprocessor data bus 1008 in the illustrative embodiment is limited to 8-bits, there is no point in providing more than a 6-bit register.

Microprocessor 1008 also gathers port status information (ring state and tones) to multiplex into the data stream, and operates to establish sync with the far end digital interface once the cross-PBX connection has been established. A flow chart showing the relationship of the principal programs executed by microprocessor 1008 is shown in FIG. 14.

After the reset state (FIG. 14, 1401) microprocessor 1008 of FIG. 10 enters the state-select phase 1404 in FIG. 14 to decide what state to enter. This decision is based on whether the port is receiving data (rdtime=-number of read interrupts per write interrupt is greater than zero). If either of these conditions if false, the processor at phase 1404 enters state 0 block 1405 in which the digital port processor provides the sync character and port status information to the digital data interface.

Once a call has been established (detected by an off-hook and continuous read interrupts) processor 1008 enters state 1, block 1406 in which it examines the input bit stream for a sync character, and continues multiplexing into the bit stream the port-to interface information.

The sync character is contained in the control channel information which is multiplexed into the data stream by the far end DI. The sync character consists of an eight bit pattern (FIG. 7.9) contained in the first byte of the control channel frame, (FIG. 7.1).

Once this sync character has been found, the DH microprocessor 225 increments a counter every frame a sync character is found, and clears the counter every frame that sync is missed. When the counter reaches a certain threshold, the processor enters state 2, block 1407 in which it just passes the data transparently, and monitors the port state for any changes.

Figure 8:
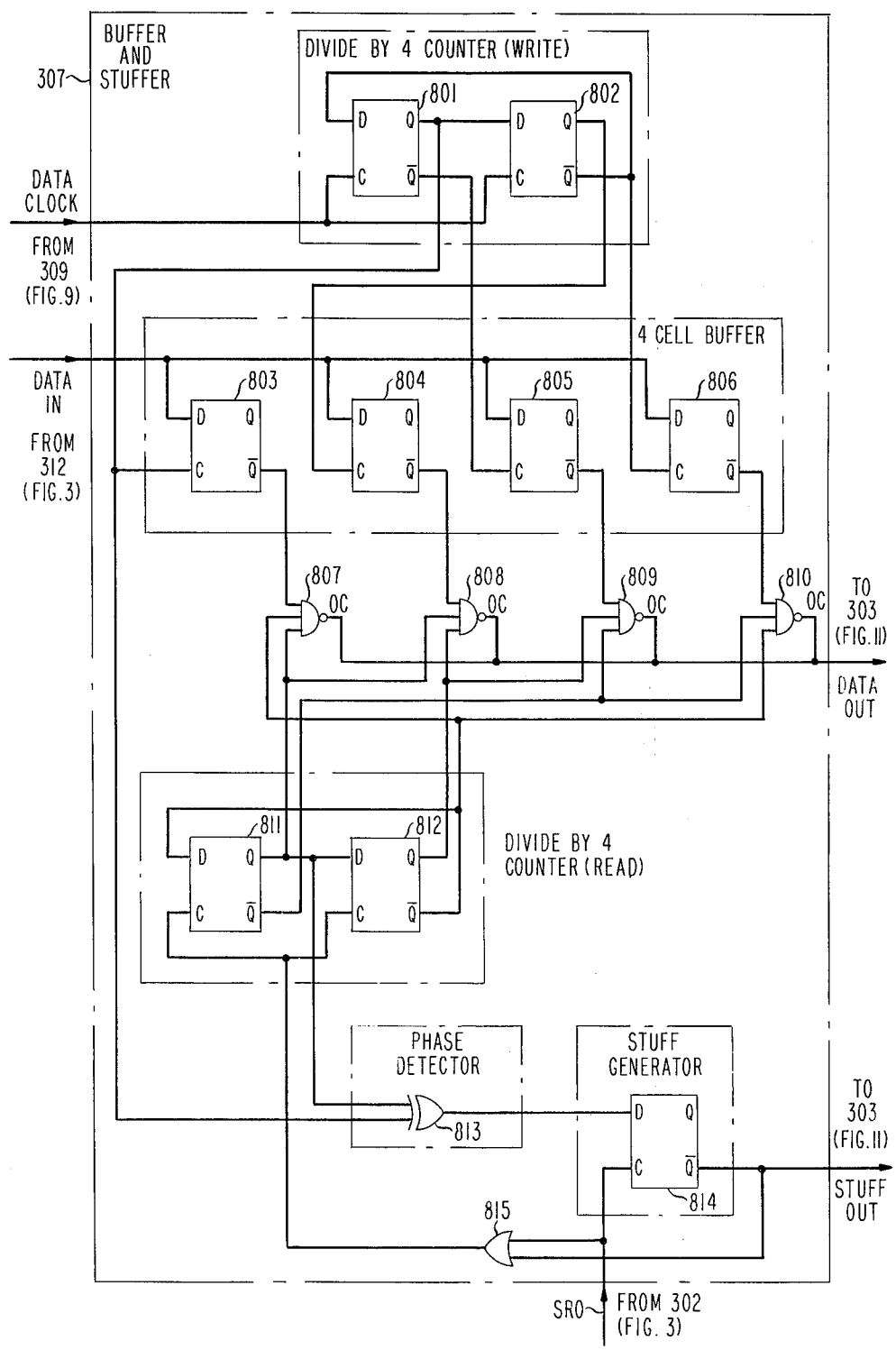
FIG. 8 shows the principal elements of the buffer/stuffer of FIG. 3.

Buffer/stuffer circuit 307 in FIG. 3 comprises the elements detailed in FIG. 8. The buffer and stuffer circuit provides the elastic store and pulse stuffing necessary to transmit 14.4 kHz data on the 16.2 kHz PAM bus. The buffer is written into from the B3ZS decoder at a 14.4 kHz rate, and read out by the PAM bus at a 16.2 kHz rate. When the read clock overtakes the write clock, the time slot is stuffed until the write clock advances. Thus, the data is transmitted at a 16.2 kHz peak rate and a 14.4 kHz average rate, with pulse stuffing making up the difference.

The buffer and stuffer is implemented by the circuit shown in FIG. 8. This circuit consists of a four cell buffer (803–806) which is written into under the control of a modulo four write clock (801–802), generated from the 14.4 kHz clock recovered from the DDL link, and read out of by a modulo four read clock (811–812) generated from the PBX time slot clock. Gate 813 acts as a phase detector, whose output is latched in flip flop 814 at the beginning of a time slot to generate a stuff signal, and to inhibit the write clock until the next time slot. To allow for long PAM bus data setup, the data is changed at the end of the current time slot, and held until the end of the next time slot.

Tone detector 304 in FIG. 3 detects and identifies various call progress tones. The tones that are to be detected are: dial tone, busy tone, audible ring tone, reorder tone, and intercept tone. These tones are detected in order to provide feedback to a user who is terminal dialing, and does not have an audio connection.

Figure 13:
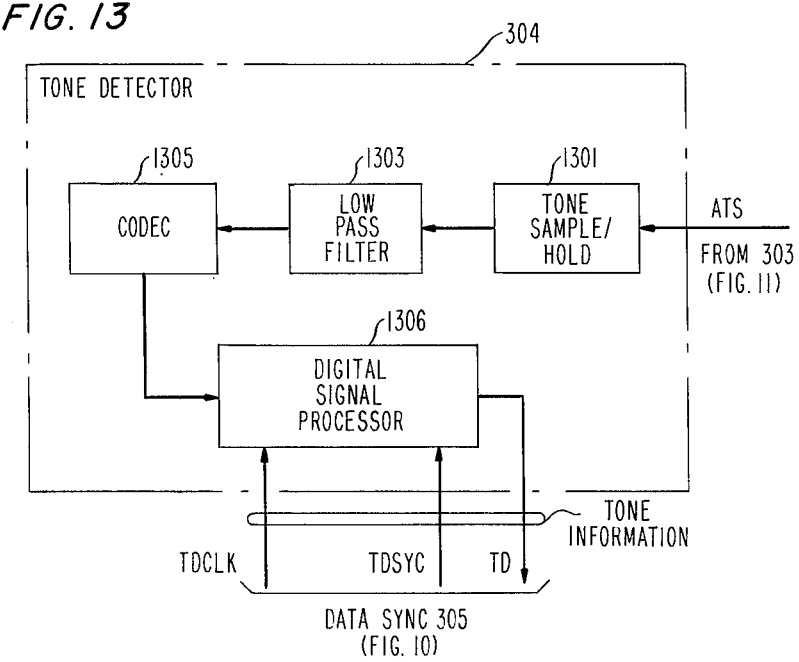
FIG. 13 shows the principal elements of the tone detector circuit of FIG. 3.

The details of tone detector 304 are shown in block diagram FIG. 13. The analog tone data is sampled and held by 1301 so that the tone sampling can be independent of the PBX's sampling rate. This sampled-and-held signal is then low pass filtered by 1303 to remove high frequency components due to data and the PBX's sampling rate. The output of the low pass filter is then further filtered to a 4 KHz bandwidth and then resampled at 8 KHz by codec 1305. The codec converts an analog input to mu-255 coded digital data for digital signal processor 1306. Digital signal processor 1306 is a special-purpose, programmable processor that can execute various signal processing functions. The output of digital signal processor 1306 is a four bit code representing the various tones that can be detected. This output is then sent to microprocessor 1008 in synchronizing and multiplexing circuit 305 (see FIG. 10) for multiplexing into the data stream via the serial control channel (see FIG. 7.7).

The source of the tones to be detected can either be the local PBX, a far end central office, or a far end PBX. Most Central Office tones in the nationwide direct distance dialing network are not precisely defined. However, the interruption rate of the tones (busy, ringback) is well-defined, as is dial tone which has been precisely defined since the introduction of dual tone signaling. Tones are detected by prefiltering out all but the call progress tone band (300–800 Hz), and by digital signal processor 1306 then measuring the interruption rate of the tones. In addition, in order to distinguish between tones having the same interruption rate, processor 1306 includes a zero-cross counter routine which determines the tones basic frequency. To allow for longer detection time required by this program, the signal input to processor 1306 is first subjected to a programmed process which decimates (down samples) the input signal by a factor of four. This reduces the effective sampling rate to 2 kHz and allows a fourfold increase in the time available for processing between samples.

Outgoing Data Handling

In transporting the data from the DDL to the PBX, the 14.4 kHz DDL clock must be recovered, the DDL data must be decoded, and the data must be pulse stuffed to a 16.2 kHz rate for transmission through the PBX. The outgoing data stream requires no bit manipulation as does the incoming stream, since it contains no digital interface to digital data port information.

Figure 9:
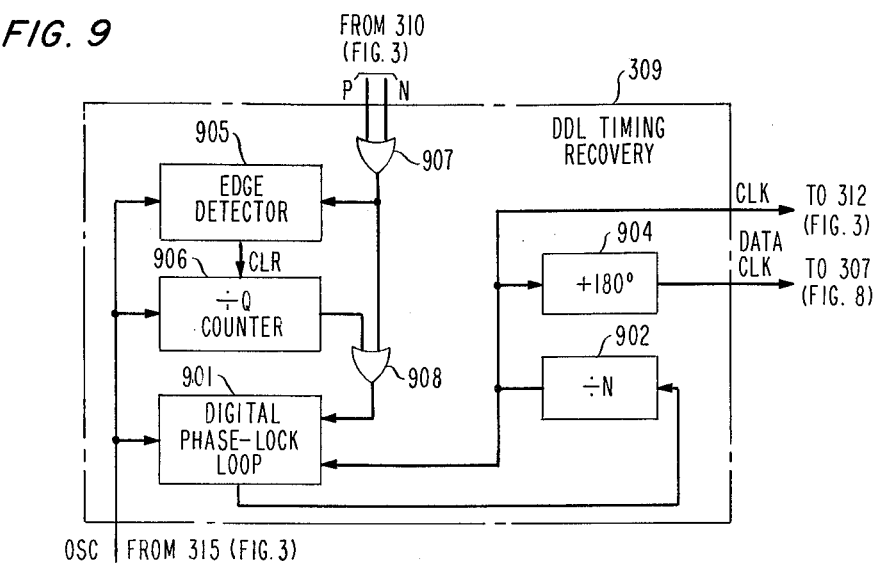
FIG. 9 shows the principal elements of the data link timing recovery circuit of FIGS. 2 and 3.

DDL timing recovery circuit 309 reconstructs the 14.4 kHz clock from the DDL data stream, which requires reconstruction of missing pulses during the transmission of zeros on the digital data link. Since B3ZS coding is used, there will never be more than two zeros in succession on the link. Details of the DDL timing recovery circuit are shown in FIG. 9. The circuit consists of an edge detector 905, a counter 906, a phase lock loop 901, and its associated divide by N counter 902. The edge detector detects the negative transition at the output of logical OR gate 907 whose inputs are the P and N signals from DDL receiver of FIG. 11. Edge detector 905 resets divide by Q counter 906. Counter 906 then free-runs and generates a pulse every (Q/2f) seconds if not reset by a pulse from the DDL receiver. Counter 906 outputs a pulse stream that duplicates the actual DDL pulse stream with no pulses missing. This pulse stream is then fed via gate 908 to the phase A input of digital phase lock loop circuit 901 in order to generate a smoothed version of the clock. The value of N and Q are chosen so that N/2f=Q/2f=14.4 kHz.

Returning now to the description of call set-up, the loop current is detected in digital port DP-1, FIG. 3, by simplex loop detector circuit 318 in FIG. 3. Circuit 318 controls time slot memory and control circuit 302 to exhibit an off-hook state to scanner bus 201SB of switching equipment 201.

PBX 201 responds to the off-hook condition of digital port DP-1 by assigning a time slot to an originating register and a dial tone source (not shown, but connected to summing bus 201S-1 and to distribution bus 201D-1) causing dial tone to be applied to PAM bus receiver/transmitter 303 of port DP-1 during the assigned time slot. This dial tone is detected by the tone detector 304 and a message is sent to the DI-via the DDL-by processor 1008.

Responsive to the terminal dialing information received by microprocessor 223 via buffer 221, simplex loop supervision circuit 260 in FIG. 2 will be controlled to make and break simplex loop current to links DDL-A1 and DDL-B1 to reflect conventional dial pulsing. At data port DP-1 simplex loop status circuit 318 relays the changes in dial pulsing loop current to time slot memory/control interface 302 which reflects the dial pulsing to PBX scan bus 201SB. Common control 201CC responds to the dial pulsing applied to bus 201SB and proceeds to set up an intra-module PBX connection from port DP-1 to port DP-2. Common control 201CC thereafter causes a ringing control signal to be applied over one of leads RBS of bus 201SB to port DP-2. Port DP-2 detects the ringing control signal and formulates a "ringing" message (see FIG. 7.7) for transmission over link DDL-B2 to its associated digital interface unit DI-2. Digital port DP-2 and digital interface DI-2 are interconnected by bipolar synchronous links DDL-A2 and DDL-B2 in similar fashion to the data link connections heretofore described between digital port DP-1, FIG. 2, and digital interface DI-1 of FIG. 3.

Digital interface DI-2 will formulate an appropriate alerting message to data terminal equipment DTE-2 in response to which equipment DTE-2 will exhibit at its EIA interface a data terminal ready-on condition.

Figure 18:
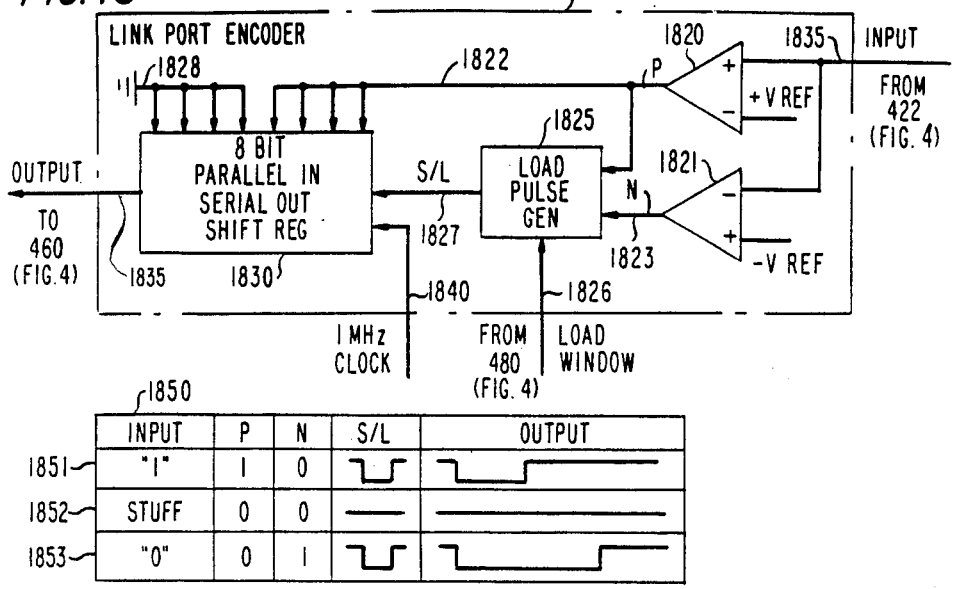
FIG. 18 is a circuit for encoding the three-state digital data signal appearing on the PBX bus of one module for transmission to another module.
Figure 19:
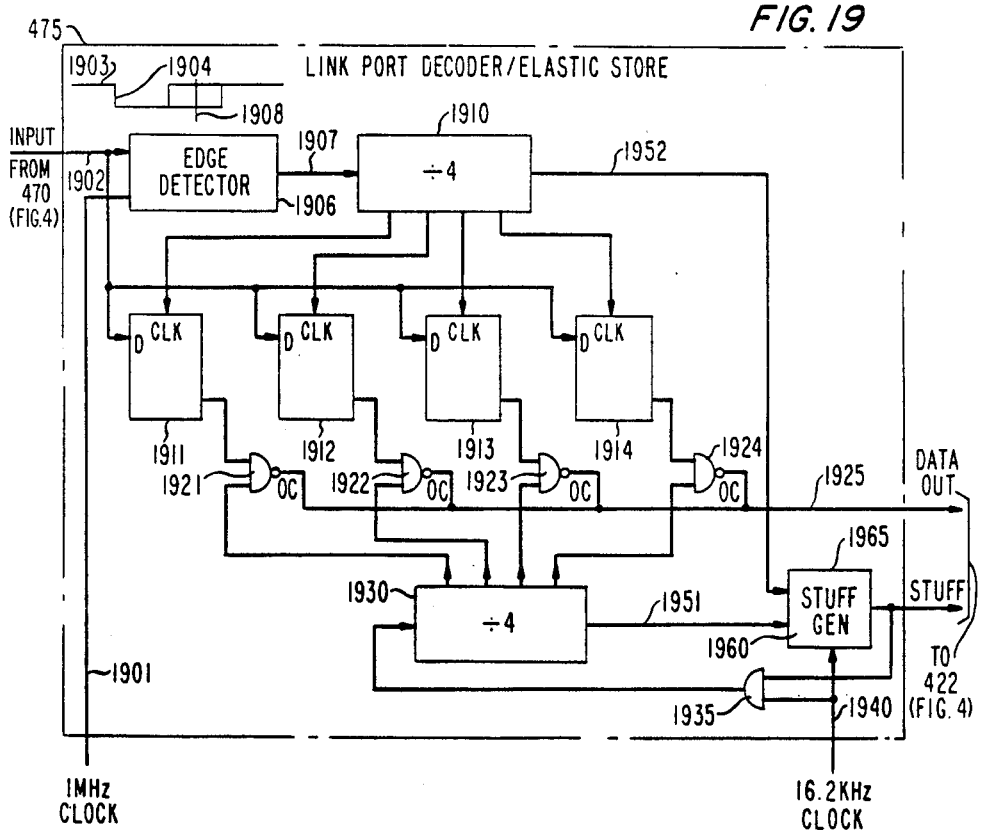
FIG. 19 is a circuit for receiving the intermodule digital data signal and buffering it for resynchronization with the PBX bus in the receiving module.

Inter-Module Voice/Data Link Port (FIGS. 4, 18 and 19)

Timing on the inter-module voice/data link circuit when in the data mode is shown in the waveforms of FIG. 4. Three information states must be transferred between modules: logic "1", logic "0" and stuff state. Since the PBX voice clocks in each module are independent of each other, the data transferred across the link must be buffered at the receiving module and then resynchronized with the PAM bus. Actual data is preceded with a start interval followed by an interval of equal duration which is either in a high state or a low state depending on the polarity of the data bit actually transferred. During time slots which were stuffed in the sending module, the start character is not sent. Note that the peak data transfer rate is at the nominal 16,200 bits per second rate of the PAM bus, while the average data transfer rate is a nominal 14,400 bits per second.

The length of the start and data intervals will be a multiple of the basic network clock interval of approximately 1 microsecond. A multiple of 4 should be adequate for proper reception in the receiving module when sampled with the 1 microsecond clock in the receiving module. Note that the frequency accuracy of the individual module clocks is plus or minus 0.05%.

The method for encoding the three state signal on the PAM bus into a three state signal over a link between modules is shown in FIG. 18.

The three level signal received from the PBX by PAM bus receiver/transmitter 422 distribution bus is compared in differential amplifier 1820 of link port encoder 405 FIG. 4, with reference voltage +VR, and in amplifier 1821 with reference voltage −VR. The outputs of the comparators 1820 and 1821 representing logic signals P and N respectively are fed to load pulse generator 1825. A third input to the load pulse generator is a load window signal applied on lead 1826 which is a 1 microsecond wide pulse that occurs once every time slot (approximately every 64 microseconds). As shown in waveform 1851 through 1853, load pulse generator 1825 applies a shift/load pulse at its output lead 1827 when a load window pulse appears on lead 1826 if the input from 1820, 1821 indicates the presence of either a "1" or a "0"state on the PBX bus. No S/L pulse is generated if the input from 1820, 1821 indicates the "stuff" state.

Eight bit parallel-in, serial-out shift register 1830 is continually clocked by a 1 MHz clock applied to lead 1840. On the occurrence of a S/L pulse a logic zero level signal is loaded into the last four stages 1828 of shift register 1830 and the output of positive comparator 1820, is loaded into the first four stages 1822 of the shift register. The resultant output signal, on lead 1835 is as as shown in waveforms 1851–1853. If the input state was "1", the output will be a four microsecond low active pulse. If the input state was "0", the output will be an eight microsecond low active pulse. If the input state was stuff, no pulse will be sent.

FIG. 19 shows the operation of the link decoder and elastic store. The input signal, 1902, represented by 1903 is fed to an edge detector in order to detect the high to low transition represented by 1904. The edge detector is clocked by 1 MHz clock, 1901, in order to "blindly"-sample the input, 1902, which is not related in phase or frequency to the 1 MHz clock, 1840, in the encoder circuit. On the occurrence of transition 1904 a strobe pulse 1907 is generated to clock divide by four counter 1910. During time slots which were stuffed in the sending module signal 1902 will always be high and no strobe will be generated. The edge detector, 1906, also provides sufficient delay such that the strobe signal, 1907, occurs at approximately 6 microseconds after transition 1904 in order to strobe input signal 1903 at the point as shown by 1908. Thus, when the strobe pulse is generated the state of the input signal will be clocked into one of the four flipflops 1911, 1912, 1913, or 1914. By generating the strobe pulse, 1907, at point 1908 either a high or a low logic level is clocked into one of the flipflops representing the "1" or "0" state, respectively, received from the PAM during time slots which were not stuffed. The four flipflops, 1911–1914, are written at an average rate of 14,400 writes per second and at a peak rate of 16,200 writes per second.

A 16,200 Hz clock, 1940 is used to increment a divide by four read counter, 1930. A stuff generator, 1960, monitors the relative phasing of the two divide by four counters by means of inputs 1951 and 1952. Whenever the state of the read divide by four counter 1930 is the same as the state of the write divide by four counter, 1910, the stuff generator, 1960, generates a stuff signal, 1965. The stuff signal, 1965, is gated with the 16,200 Hz clock, 1940, by AND gate 1935. This causes the divide by four read counter to be inhibited (i.e. not incremented) whenever the stuff generator generates a stuff signal.

The data signal, 1925, is the result of the wired OR of the outputs of gates 1921, 1922, 1923, and 1924. The four phases from the read divide by four counter, 1930, are high active and are mutually exclusive with respect to the high active state. Thus, the data signal, 1925, represents the output of one of the four flipflops, 1911–1914, at any given instant of time.

What is claimed is:

1. Apparatus for effecting digital character communications between first and second end units (DTE-1, DTE-2) operable in asynchronous character transmission modes, said apparatus comprising a first interface unit (DI-1) for local connection to said first end unit, a second interface unit (DI-2) for local connection to said second end unit, data transmission means (DDL-B1 DP-1, 201S-1, DP-2, DDL-B2) interconnecting the first and second interface units, a first clock (DI-1:250) in the first interface unit arranged to operate at a prescribed nominal frequency for controlling the rate of transmission of characters received from the first end unit to the second interface unit via the data transmission means, a second independent clock (DI-2:250) in the second interface unit also arranged to operate at said prescribed nominal frequency for controlling the rate of transmissions of characters received from the first interface unit to the second end unit, and means (POLL2, OVERRUN) in the second interface unit for detecting a deviation in frequency from the nominal frequency of one or both of the first and second clocks manifested by a slower rate of transmission of characters from the second interface unit to the second end unit than the rate of reception of characters from the first interface unit, and including, means responsive to the detecting means for temporarily increasing the rate of operation of the second clock.

2. The invention of claim 1 wherein the frequency deviation detecting means further comprises means for decreasing the rate of operation of the second clock responsive jointly to a temporary increase in the rate of operation of the second clock and said detecting means detecting a slower rate of arrival of characters from the first interface unit relative to the rate of character transmission from the second interface unit to second end unit.

3. The invention of claim 1 wherein the means for detecting a deviation in frequency from the nominal frequency of one or both of the first and second clocks further comprises a microprocessor (225), including an OVERRUN register initially containing a prescribed number and an incoming character queue, for storing characters received from the first interface unit said microprocessor being responsive to the condition of a number of characters in the queue greater by a first predetermined amount than the number in the OVERRUN register to increase the rate of the second clock by a first prescribed amount.

4. The invention of claim 3 wherein the microprocessor is further operative to increment the number stored in the OVERRUN register by a first predetermined value jointly with an increase in the rate of the second clock.

5. The invention of claim 4 wherein the microprocessor is responsive to a number of characters in the queue less than the number stored in the OVERRUN register by a second predetermined amount occurring after the rate of the second clock is increased for decreasing the rate of the second clock by a second prescribed amount and for decrementing the number stored in the OVERRUN register by a second predetermined value.

6. A first digital end unit operable 25. In combination, a first digital end unit (DCE-1, DTE-1) operable to generate digital signals at a nominal first data rate,
- a first interface unit (DT-1) connected to the first end unit,
- a host machine (201) operable at a nominal second data rate,
- a data link (DDL-B1) connecting the first interface unit to input port means (DP-1) of the host machine, machine,
- means (240) in the first interface unit for multiplying the first data rate by a constant factor to define a third rate greater than the first data rate and less than the second data rate for transmitting the digital signals and other data over the data link to the port means, wherein the port means comprises,
- means (307, 303) responsive jointly to the digital signals arriving on the data link at the third data rate and to clock signals at the second data rate for converting the digital signals into three state signals, including means for generating a "stuff" signal as a third state each time the second data rate laps the third data rate.

7. The invention of claim 6 wherein the converting means further comprises,
- a modulo-n write counter (801-802) operated at the third data rate,
- an n-stage buffer (803-806) responsive to the write counter for sequentially and cyclically storing the states of the incoming digital signals,
- a modulo-n read counter (811-812) operated at the second data rate,
- gate means (807-810) responsive to the read counter for sequentially and cyclically reading the digital signals from the buffer,
- means (813-815, time slot switch control logic and 1151--FIG. 11) for disabling the read counter for a prescribed number of count cycles each time the read counter laps the write counter for generating the "stuff" signal.

8. The invention of claim 6 wherein the host machine further comprises a time slot bus (201S-1) connected to the input port means for switching the three state signals to an output port means, said output port means comprising,
- means (1108-1110, 1113) for generating a gapped clock stream by generating a clock pulse in response to each non-"stuff" state of each three-state signal,
- input buffer means (1004) operated by each data signal from the time slot bus,
- means (1003) responsive to the gapped clock signals for generating a smooth clock stream at the third data rate,
- output buffer means (1007),
- means (1008) for transferring data signals from the input buffer means to the output buffer means, said output buffer means being responsive to the smooth clock stream for outputting the data signals stored therein.

9. The invention of claim 6 wherein the host machine comprises a plurality of modules, each module having a said input data port interfacing to a said data link and a link port (VDLP-1), each said link port having
- a first input for receiving said three-state signals from the associated input data port means,
- a first output for transmitting information to a link port in another module,
- a second input for receiving information from the first output of another link port,
- a second output for transmitting information to the output data port means associated with the module,
- means (450) for detecting non-"stuff" signals received at the first input and for outputting pulse-width-modulated signals to the first output according to the state of said non-"stuff" signals,
- means (475) responsive to said pulse-width-modulated signals received at the second input from other link ports for regenerating said three-state signals and outputting the three-state signals on the second output port.

* * * * *